United States Patent
Page

(10) Patent No.: US 9,674,260 B2
(45) Date of Patent: Jun. 6, 2017

(54) SYSTEM AND METHOD FOR EXCHANGING AND DISPLAYING RESOURCE VIEWING POSITION AND RELATED INFORMATION

(71) Applicant: John Henry Page, Washington, DC (US)

(72) Inventor: John Henry Page, Washington, DC (US)

( * ) Notice: Subject to any disclaimer, the term of this patent is extended or adjusted under 35 U.S.C. 154(b) by 17 days.

(21) Appl. No.: 13/938,122

(22) Filed: Jul. 9, 2013

(65) Prior Publication Data

US 2015/0019999 A1 Jan. 15, 2015

(51) Int. Cl.
*G06F 3/048* (2013.01)
*H04L 29/08* (2006.01)
*H04L 29/06* (2006.01)

(52) U.S. Cl.
CPC .......... *H04L 67/02* (2013.01); *H04L 65/1016* (2013.01)

(58) Field of Classification Search
CPC ..... G06F 3/0482; G06F 3/0481; G06F 3/0484
See application file for complete search history.

(56) References Cited

U.S. PATENT DOCUMENTS

| | | | |
|---|---|---|---|
| 4,093,819 A | 6/1978 | Saito | |
| 4,873,662 A | 10/1989 | Sargent | |
| 5,634,127 A | 5/1997 | Cloud | |
| 7,774,703 B2* | 8/2010 | Junuzovic et al. | 715/246 |
| 8,635,021 B2* | 1/2014 | Heng et al. | 701/459 |
| 8,782,560 B2* | 7/2014 | Purdy et al. | 715/834 |
| 2004/0021685 A1* | 2/2004 | Denoue et al. | 345/721 |
| 2004/0201628 A1* | 10/2004 | Johanson et al. | 345/764 |
| 2004/0205514 A1* | 10/2004 | Sommerer | G06F 17/212 715/205 |
| 2006/0190837 A1* | 8/2006 | Jarczyk | 715/778 |
| 2008/0229213 A1* | 9/2008 | Hamilton et al. | 715/751 |
| 2009/0169060 A1* | 7/2009 | Faenger et al. | 382/113 |
| 2009/0249223 A1* | 10/2009 | Barsook et al. | 715/753 |
| 2010/0037153 A1* | 2/2010 | Rogers | G06F 3/0481 715/758 |
| 2011/0010640 A1* | 1/2011 | Fox et al. | 715/753 |
| 2012/0005598 A1* | 1/2012 | Burckart | G06F 17/30873 715/753 |
| 2012/0060082 A1* | 3/2012 | Edala et al. | 715/231 |
| 2012/0198332 A1* | 8/2012 | Shimada et al. | 715/272 |
| 2013/0160142 A1* | 6/2013 | Lai et al. | 726/28 |
| 2013/0191720 A1* | 7/2013 | Simons | G06F 17/30882 715/234 |
| 2013/0297206 A1* | 11/2013 | Heng et al. | 701/532 |
| 2014/0019881 A1* | 1/2014 | Narita | H04L 65/403 715/753 |
| 2014/0033067 A1* | 1/2014 | Pittenger et al. | 715/751 |
| 2014/0033073 A1* | 1/2014 | Pegg | 715/753 |
| 2014/0075004 A1* | 3/2014 | Van Dusen et al. | 709/223 |
| 2014/0101571 A1* | 4/2014 | Lewis | 715/753 |
| 2014/0223335 A1* | 8/2014 | Pearson | 715/753 |
| 2014/0280195 A1* | 9/2014 | Etzioni et al. | 707/741 |

* cited by examiner

*Primary Examiner* — Kevin L Young
*Assistant Examiner* — Haimei Jiang

(57) ABSTRACT

Methods, apparatus and software allowing a plurality of users to exchange and display information in real time or near real time regarding the resources each of them is viewing. This information is mapped graphically through the positioning and appearance of tokens representing other users relative to the resources currently displayed to each user.

27 Claims, 19 Drawing Sheets

| Event Type | Event Description | Data content of User Data Exchange |
|---|---|---|
| L | Location Update | User Identity Token, Expedition Identifier, Identity of Resource User Display Location, Positional Parameters, Comment Message Date/Timestamp |
| P | Private Location Update | User Identity Token Expedition Identifier Identity of Resource User Display Location Date/Timestamp Resource Message (with private information removed) |
| G | Group Update | User Identity Token of Group Leader String of other User Identity Tokens Function indication (add/change/delete/block) Group Identifier Expedition Identifier Date/Timestamp |

1401, 1402, 1403

| Event Type | Event Description | Data content of User Data Exchange |
|---|---|---|
| C | Change Leader | User Identity Token of Group Leader Expedition Identifier User Identity Token of New Leader Date/Timestamp |
| X | Exit Expedition | User Identity Token Expedition Identifier Date/Timestamp |
| E | Expedition Create/Update | Expedition Name Expedition Identifier Identity of Resource User Identity Token of Group Leader Leader User Token string of other User Identity Tokens Date/Timestamp |
| A | Administration | Administrator User Identity Token User Identity Token Configuration Parameter Parameter Value |

©2013 John H. Page

SYSTEM AND METHOD FOR EXCHANGING AND DISPLAYING RESOURCE VIEWING POSITION AND RELATED INFORMATION

A portion of the disclosure of this patent document contains material which is subject to (copyright or mask work) protection. The (copyright or mask work) owner has no objection to the facsimile reproduction by anyone of the patent document or the patent disclosure, as it appears in the patent and trademark office patent file or records, but otherwise reserves all (copyright or mask work) rights whatsoever.

FIELD OF THE INVENTION

The invention relates generally to graphical user interfaces and exchange of displayed and displayable information, and more specifically to electronic transmission, receipt and storage of resource viewing position and related status information and messages and their contextual display.

BACKGROUND OF THE INVENTION

Users that view information resources have a need, either social or business-driven, to share their individual resource viewing experiences. Such sharing should augment but not unnecessarily constrain a users' information resource viewing actions.

Currently, users generally achieve this by manually cutting and pasting resources and/or links, adding comments and sharing through a discrete electronic message. The laboriousness of such manual operations inhibits sharing of on-line experiences. Accordingly, there is a need not only to automate such operations but also to augment them by presenting users information about other users' experiences in context with the current resource displays of the users and their respective resource viewing histories.

BRIEF SUMMARY OF THE INVENTION

According to an embodiment of the present invention, users may be grouped together and view and share information about resources they are viewing with other users automatically and in real time. Each user's actual viewing position within resources, such as web pages, may be automatically shared with other users in a group for display in a graphical map that is separately displayed or overlaid on a resource presently being viewed. Comments and other information associated with users may be displayed in the map to facilitate a group expedition among a specific resource, a set of resources or a wide open body of resources. In this manner, groups can accumulate and share viewing experiences rapidly.

The system computes and transmits information about the resource viewing experiences of a user, receives corresponding information from other users, keeps a store of such user data exchanges and displays said information relative to the current user's resource viewing location and the combined user histories in real-time or near real-time.

The invention facilitates resource exploration through the exchange and display of user activity information in real-time or near real-time, displaying users' viewing positions graphically in accordance with display position rules, thereby communicating to each user an intersubjective awareness of other users' activities and the history thereof. For example, whether the other user is looking at the same resource as the current user or, if a different resource, whether the other user has visited the current resource or not.

Where users enter comment information, this is displayed in context with that user's viewing position or can be attached to a specific location within a resource. Knowing other users' relative viewing positions in this way, users may select a hyperlink to see the resources another user is viewing or has commented on. The invention additionally supports naming topics to be explored, the specification of groups or teams to explore those topics and multiple simultaneous explorations, security features and an additional user whose general purpose is to make suggestions that are helpful to the users.

Examples of the benefits of such utility can be found in the on-line corollaries of a shopping expedition, a classroom with pupils and a teacher or a business research effort conducted by a number of colleagues. When shopping, users want to be able to view and explore items of particular interest to them but to also be aware of and view what is interesting to their co-shoppers; hence the system allows the users to pursue their own specific tastes within an overall group activity. In a classroom of pupils, rather than a simple lecture format, a teacher may want to have pupils work in one or more teams defined by the teacher to investigate a set of topic-related resources constrained by the teacher; hence the pupils will learn by group discovery in teams, exchanging information about what they are learning in a more transparent yet controlled manner than currently. During business research, a group of workers may research a topic together and, by being aware of what other resources have been visited by other team members, can avoid duplication while at the same time share contextual comments about certain resources; in this way users will be able to more efficiently and effectively conclude their research with the option of storing the research process for reference.

The system provides users the novel freedom of individual action to pursue their own line of resource exploration and investigation yet at the same time enjoy a much richer experience through being aware of and able to draw on the results of others' discoveries. Organizations will thus be able to provide users these richer experiences at minimal cost and, especially useful in a work environment, increased transparency of individual activity and viewing location relative to pertinent resources.

According to one embodiment of the invention, a method processes user display location data related to an electronic resource. The method includes determining, using a processor, a first user's display location within a first electronic resource, receiving at least one other user display location and associated information within a second electronic resource of at least one other user and displaying the first electronic resource and a map of the user display location of the at least one other user. The user display location data received may include a user identity token identifying the other user, the identity of the electronic resource being displayed to the other user and positional parameters indicating which portion of the second electronic resource is being displayed to the other user. The first and second electronic resources may be the same or different and the displaying may be done in any graphical user interface, including via user sizable and selectable windows. The map itself may be overlaid on top of the display of the first electronic resource or may be separately displayed.

The positional parameters may include one or more directional distance ratios derived from distance between the beginning of the second resource and a point within the portion of the second resource actually displayed in that direction compared to the distance between the beginning and end of the second resource when fully displayed in a that direction. The positional parameters may refer to vertical and horizontal or other directions and may also include scaling factors including, for example, those derived from the number of display windows that would be required to display the fully displayable resource from beginning to end in a direction.

According to another embodiment of the invention, the method further includes determining, using a processor, a user's display location including the identity of the electronic resource being displayed and transmitting that user display location to at least one other computing device. The transmitting may include transmitting an electronic resource being displayed, a comment message from a user, and/or transmitting data referencing a specific display element within the electronic resource to which the comment applies. Representations of one or more users are displayed at map positions based on the identity of the electronic resources the other users are viewing and their positional parameters relative to identity of the electronic resource and the positional parameters of the current user and the resources underlying the representations of other users may be selected as a link and displayed by the current user.

According to another embodiment of the invention, a method of processing user display locations of a group of users, includes grouping users to form an expedition to view at least one resource, editing optional configuration parameters used to control how information attached to a user and their user display location data is processed or suppressed, determining, using a processor, positioning of representations of users within adjustable display zones of a map based on their user display location data, and displaying a map containing representations of the users within their display zones. The display zones may be based on status and include, for example, an inactive zone (for an inactive user), an upstream zone (user has already seen a resource the other user is viewing), a downstream zone (user has not already seen a resource the other user is viewing) and a user location display zone (user is currently viewing the resource the other user is viewing). Placement of user identity tokens within a zone may be adjusted vertically and horizontally based on another user's distance ratio positional parameter in the relevant direction within the resource being displayed to the other user and a scaling factor in the vertical direction. The upstream and downstream directions may be transposed if the language preference of the user is read from right to left instead of left to right. The placement or offset of tokens may also be determined in any direction based on the relative distance ratios and scaling factors of the user display locations of the current user and the other user.

Additional embodiments include deriving and displaying at least one symbol associated with each user display token conveying additional information about other users. The additional information may include any convenient information, including whether the current user has previously seen the resources displayed to another user or conversely whether the other user has previously seen the resources currently being viewed by the current user. The additional information may further include whether another user is viewing a resource containing an endless scrolling feature and for which the fully displayable size is indeterminable. The token display may also be varied to indicate user activity level derived from the timing of changes in their user display locations, such as states of offline, where there is no user display location data, inactive recently, for an adjustable period of time, inactive for a significant period of time, for an adjustable period of time and most recently active of all said users as a few examples. The additional information may be displayed through alpha-numeric characters or graphical techniques associated with tokens. Additionally, information associated with users for display may be processed or suppressed and the resources available to groups of resources may be limited or unrestricted. Configuration parameters may include a subject name for an expedition of a group of users, and the ability to limit the user display location data used in deriving the map of user identity tokens and associated symbols and counters to those data occurring within a group expedition or to exclude certain user display location information in deriving the map of user identity tokens and associated symbols and counters based on time.

According to another embodiment of the invention, a method includes receiving the user identity token of a relevant user with the identity of any displayed electronic resource and positional parameters within that electronic resource and receiving configuration parameters used to control how information associated with a user is processed, storing the identity token of the relevant user with the identity of any displayed electronic resource and their positional parameters within that electronic resource and storing any configuration parameters used to control how information attached to a user and their user display location data is processed. The method may also include receiving and storing on one or more server computers the user identity token of the relevant user with the identity of any displayed electronic resource and their positional parameters within that electronic resource and receiving any configuration parameters used to control how information attached to a user and their user display location data is processed and transmitting any of said user's positional parameter and related data stored on such server computers to a plurality of user's computing devices. The method may further include selecting from the store which positional parameter and related data is to be further processed, processing to summarize the positional parameter and related data to offer any user, expedition, resource and time-based view of that data and displaying on a user display a given view of the selected data. The method may further include receiving any of said user's positional parameter and related data at a guide user computer with access to a resource search engine, comparing said user's positional parameters and related data through the resource search engine with the resources available to the resource engine, selecting from the resources available to the resource engine information with relevance to the user's positional parameters and related data and participating in the relevant group expedition as a guide user and contributing resource information with relevance to user's positional parameter and related information.

According to another embodiment of the invention, an apparatus for displaying user display location data related to an electronic resource includes a display, an input/output hardware unit and a program memory coupled to a processor. The input/output hardware unit is capable of exchanging user display location data with a network and data associated with electronic resources accessible over the network. The program memory stores program instructions and the a processor executes program instructions to (i) determine a first user's display location within a first electronic resource, (ii) receive at least one other user display location and associated information within a second electronic resource of at least one other user, and (iii) display the first electronic resource on the display together with a map of the user display location of the at least one other user.

According to another embodiment of the invention, a system for processing user display locations of a group of users includes a display, an input/output hardware unit, and a program memory coupled to a processor. The input/output hardware unit is capable of exchanging data with a network. The program memory stores program instructions and the a processor is capable of executing the program instructions to (i) receive data from users and group users to form expeditions to view at least one resource, (ii) edit optional configuration parameters that control how information associated with a user and a user's display location data is processed or suppressed, (iii) determine positions for representations of users within display zones of a map based on each user's display location data, and (iv) display on the display a map containing representations of the users within their display zones.

According to another embodiment of the invention, a system for processing current and historical user display locations within electronic resources includes a database, an input/output hardware unit, and a program memory coupled to a processor. The input/output hardware unit is capable of exchanging data with a network. The program memory stores program instructions and the a processor is capable of executing the program instructions to: (i) receive and store in the database a user identity token of a relevant user with an identity of any displayed electronic resource and the relevant user's positional parameters within that electronic resource, and (ii) receive and store in the database configuration parameters used to control how information associated with a user and a user's display location data is processed and transmitted.

According to another embodiment of the invention, a computer program product includes computer program logic stored in a tangible medium, wherein the computer program logic includes determining logic for causing a computer to determine a first user's display location within a first electronic resource, receiving logic for causing the computer to receive at least one other user display location and associated information within a second electronic resource of at least one other user, and displaying logic for causing the computer to display the first electronic resource on the display together with a map of the user display location of the at least one other user.

According to another embodiment of the invention, a computer program product includes computer program logic stored in a tangible medium, wherein the computer program logic includes receiving logic for causing a computer to receive data from users and group users to form expeditions to view at least one resource, editing logic for causing the computer to edit optional configuration parameters that control how information associated with a user and a user's display location data is processed or suppressed, determining logic for causing the computer to determine positions for representations of users within display zones of a map based on each user's display location data, and displaying logic for causing the computer to display a map containing representations of the users within their display zones.

According to another embodiment of the invention, a computer program product includes computer program logic stored in a tangible medium, wherein the computer program logic includes receiving logic for causing a computer to receive and store in a database a user identity token of a relevant user with an identity of any displayed electronic resource and the relevant user's positional parameters within that electronic resource, receiving logic for causing the computer to receive and store in the database configuration parameters used to control how information associated with a user and a user's display location data is processed and transmitted.

BRIEF DESCRIPTION OF THE SEVERAL VIEWS OF THE DRAWING

The foregoing features and advantages are illustrative only and will be more fully appreciated in view of the appended figures described below.

FIG. 14 shows key data elements associated with user data exchanges with certain event types.

FIG. 16 also illustrates a resource preview feature next to user B's token.

DETAILED DESCRIPTION OF THE INVENTION

According to an embodiment of the present invention, users may be grouped together and view and share information about resources they are viewing with other users automatically and in real time. Each user's actual viewing position within resources, such as web pages, may be automatically shared with other users in a group for display in a graphical map that is separately displayed or overlaid on a resource presently being viewed. Comments and other information associated with users may be displayed in the map to facilitate a group expedition among a specific resource, a set of resources or a wide open body of resources. In this manner, groups can accumulate and share viewing experiences rapidly.

Figure 1:
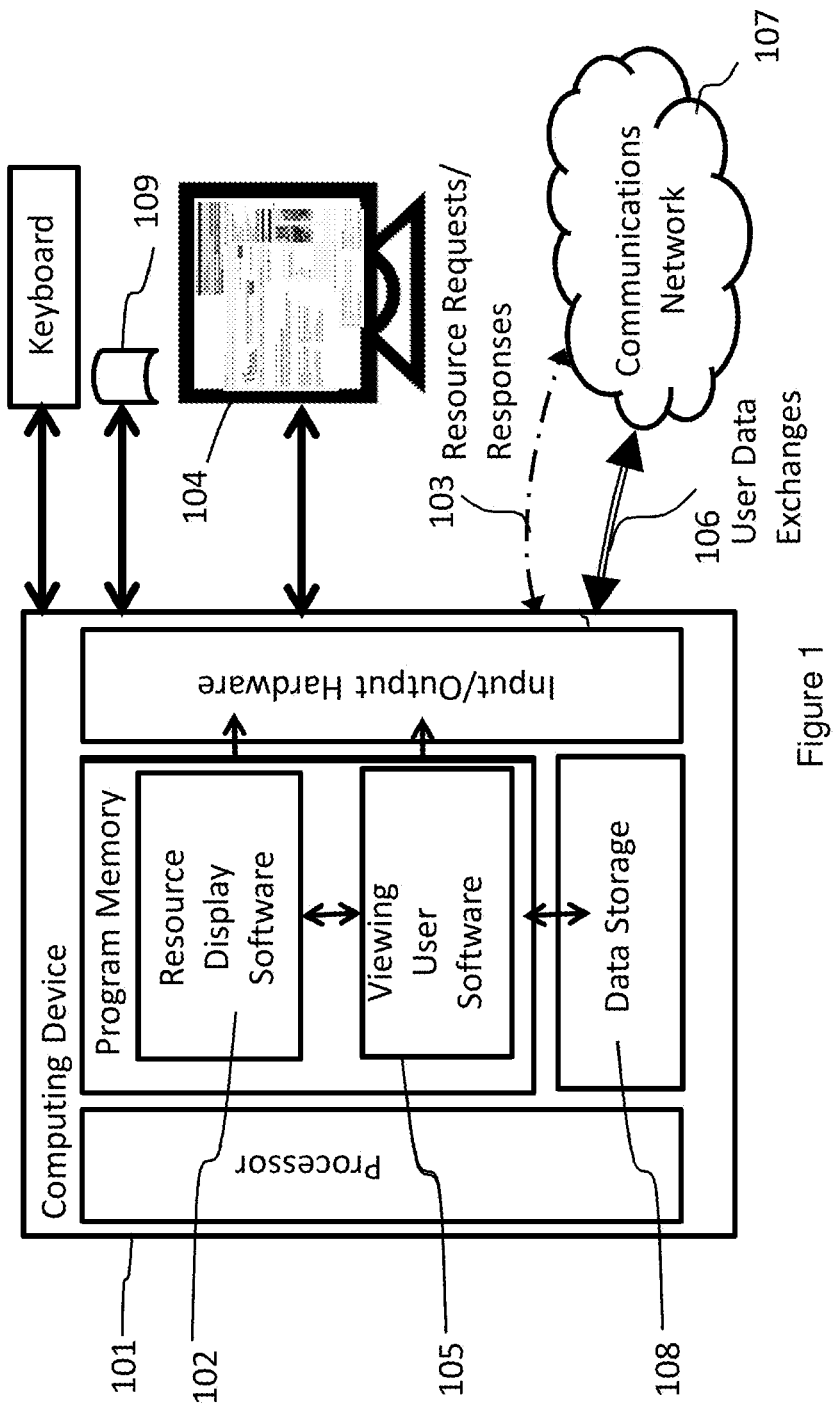
FIG. 1 shows a user's computing device connected to a user display and a communications network according to an embodiment of the invention.

FIG. 1 shows a user's computing device connected to a user display and a communications network according to an embodiment of the invention. The computing device's processor is running: i) resource display software that issues resource requests over a communications network and receives responses and renders the resources on user display device(s) and ii) viewing user software that monitors a user's viewing position (their "user display location"), transmits it plus any parameter edits to other users in user data exchanges over a communications network, receives and stores user data exchanges from other users and augments a resource display with information derived from user data exchanges to produce a display map.

Referring to FIG. 1, viewing user software 105 in a preferred embodiment is an add-on or extension to one or more instances of resource display software 102 but which may also incorporate or be an integral part of said resource display software 102. Such software resides in program memory of a user's computing device 101 being executed by the processor(s) of that device using data storage 108 memory to hold information used by the viewing user software 105. The user computing device 101 also comprises input/output hardware which couples with one or more user displays 104, optionally a keyboard and pointing device 109 and with one or more communications networks 107. The resource display software 102 displays resources that may already reside on the user computing device 101 or be retrieved over a communications network 107 using resource requests/responses 103. In a preferred embodiment, the viewing user software 105 augments the graphical interface of the resource display software 102 which presents resources on a user display 104 in real-time or near real-time. These augmentations are computed by the viewing user software 105 from parameters edited by a user (see also flow at FIG. 5) and from user data exchanges 106 that it transmits and receives over a communications network 107. This arrangement is illustrated at FIG. 1.

Figure 2:
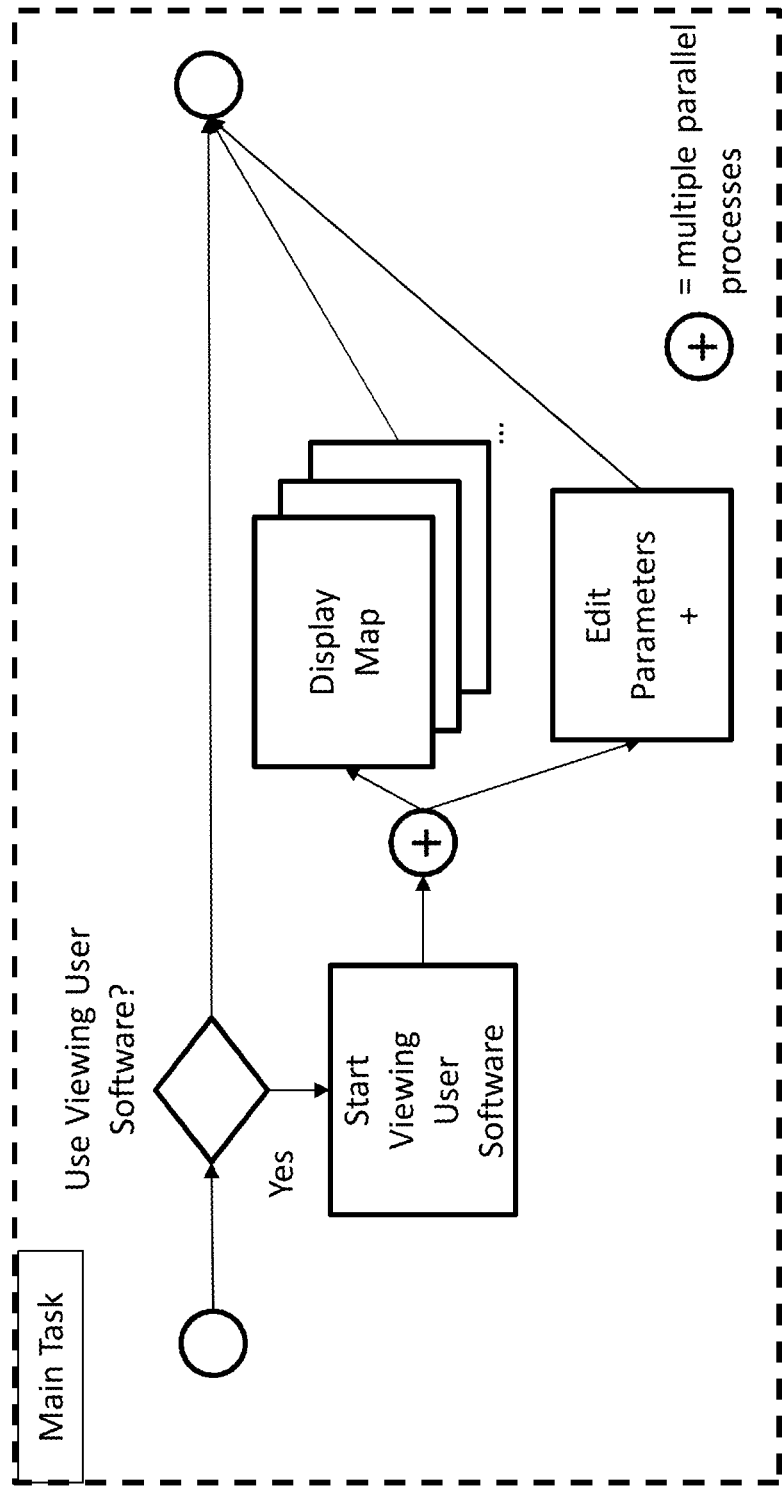
FIG. 2 is a high level view of the system's operation from a single user's perspective showing that a user may opt not to use viewing user software and may thereafter edit parameters used by the system and they may have multiple resource viewing sessions taking place concurrently, according to an embodiment of the invention.

In a preferred embodiment, the user may opt not to use viewing user software 105 when viewing resources and this option is shown at the beginning of the flow in FIG. 2. If the user opts to use viewing user software 105 said software will augment displayed resources to produce a display map 1704 containing a user location display zone 1603. Where a user is viewing multiple resources, the viewing user software 105 may produce the augmented display map 1704 for each such resource; this is shown in FIG. 2.

FIG. 2 is a high level view of a preferred embodiment's system operation from a single user's perspective showing that a user may opt not to use viewing user software and may thereafter edit parameters used by the system and they may have multiple resource viewing sessions taking place concurrently. Referring to FIG. 2, the multiple display maps in the flow preceded by a circle containing a plus sign denotes that multiple parallel processes are occurring, for example the user has concurrent display windows or resource display tabs open, or otherwise has arranged parallel or independent views of resources, which may or may not be displayed simultaneously or one at a time or in a user selectable and/or resizable form. A user may, at the same time, edit parameters that customize behavior of viewing user software 105 they are using.

Figure 3:
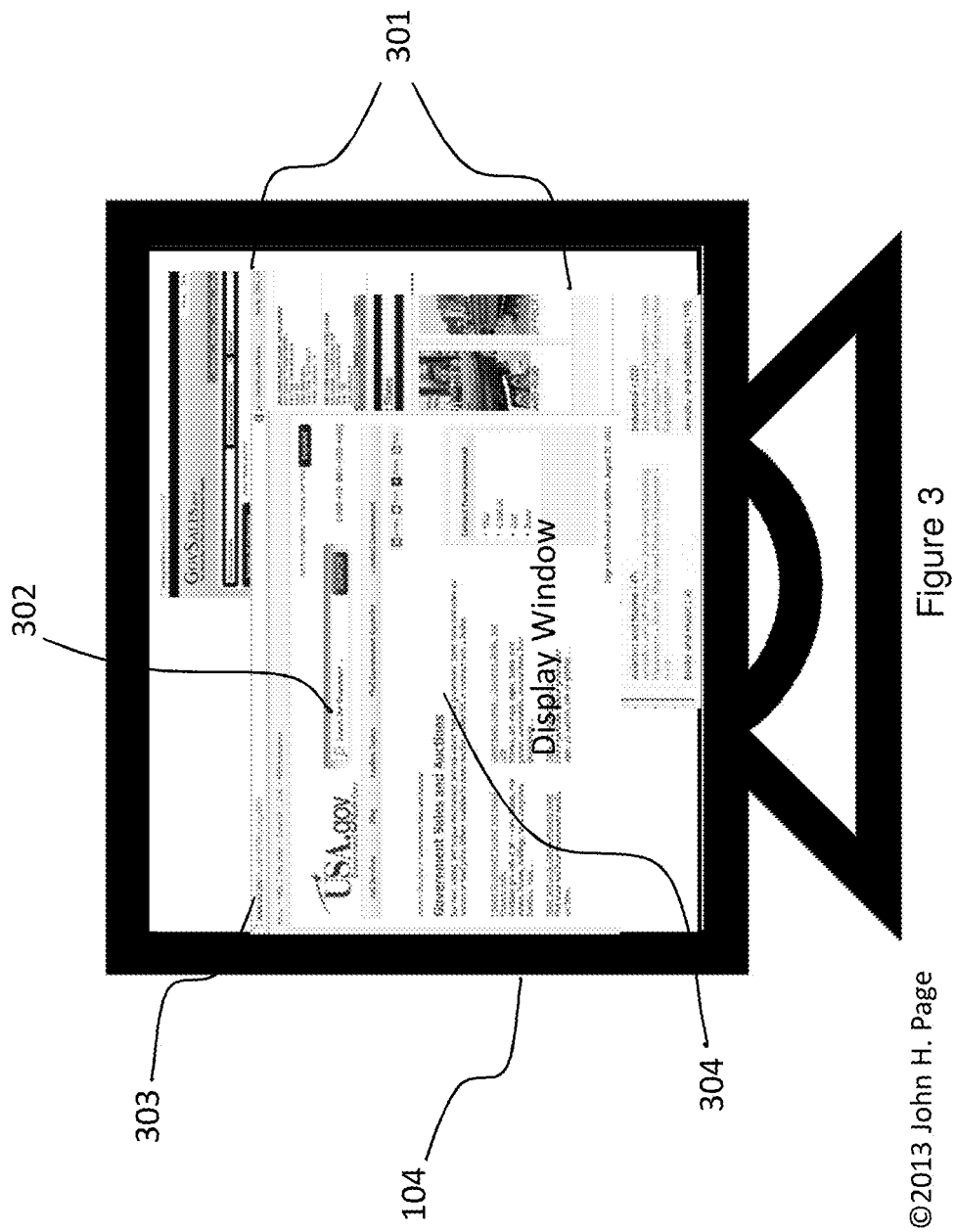
FIG. 3 shows the relationship between a user display and one or more display windows containing full or partial resource displays, according to an embodiment of the invention.

User displays 104, which may comprise more than one display device, present resource displays 302 produced by resource display software 102 within display windows 301. Generally, an identity of resource 303 is displayed within a resource display 302 and, if resource display software 102 supports tabbed resource displays 302, generally an identity of resource 303 refers to the current tab. The topmost display window 301 may be considered the active or current window. A user's user display location 304 at any point in time is the identity of resource 303 for one or more active display windows 301 plus their viewing position within that resource, reckoned in a preferred embodiment relative to the dead center of their resource display 302. This nomenclature is illustrated at FIG. 3. The identity of resource 303 label formats may comprise standard labels such as industry standard Uniform Resource Identifiers ("URIs") specified in IETF RFC 3986 et seq. and Uniform Resource Locators ("URLs") IETF RFCs 4248, 4266 et seq. Once resources have been received as a result of a resource request/response 103, resource display software 102 generates a resource display 302 on a user display 104 within a display window 301.

To denote a user's viewing position relative to the current user's user display location 304, a user identity token 409 is employed. Because, in a preferred embodiment, the dead center of a user's resource display 302 is their current location, if their own token is to be displayed it will always appear in a preferred embodiment at the dead center of the resources displayed in the active display window 301.

Figure 4:
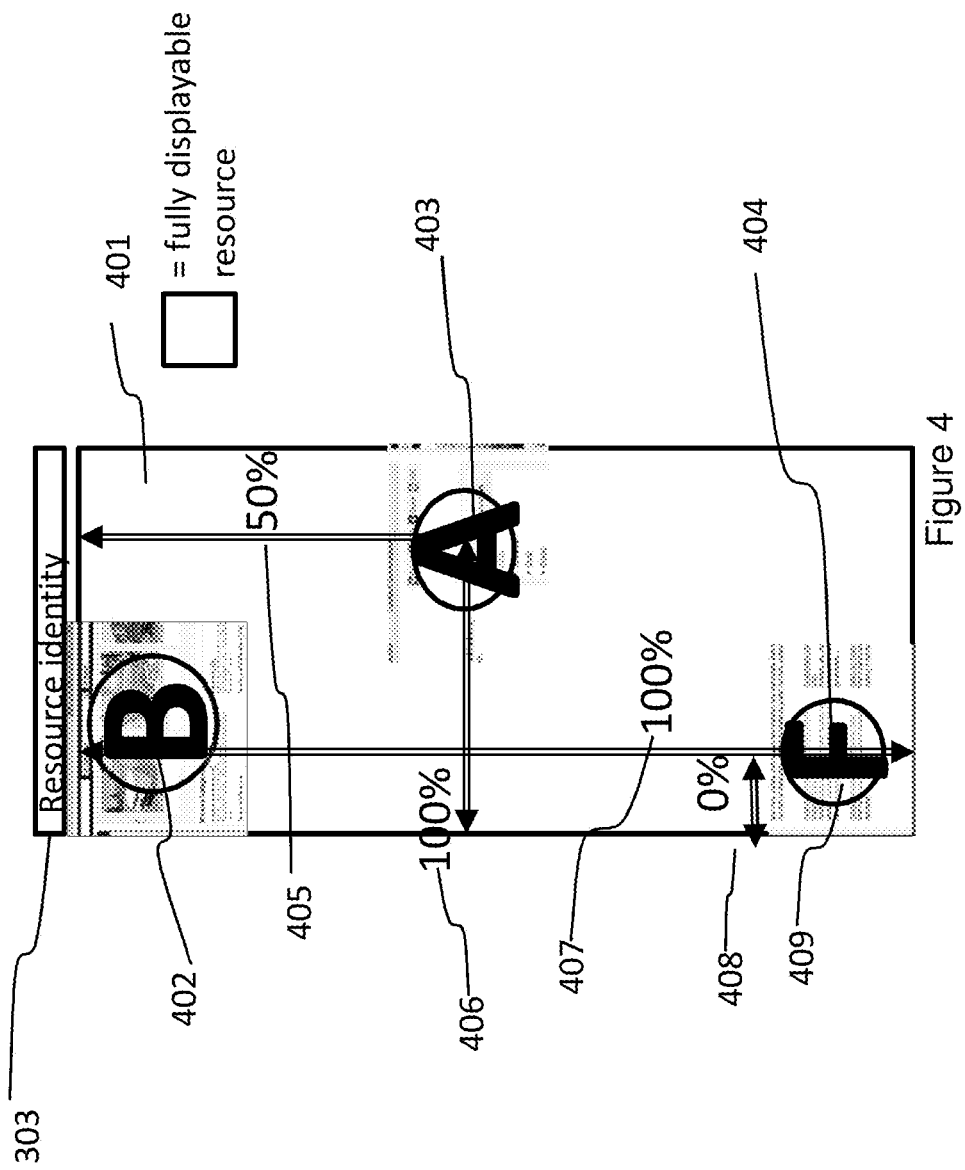
FIG. 4 illustrates that users may see a portion of a fully displayable resource in a display window and that this portion may form a basis of computing their user display location within a resource, according to an embodiment of the invention.

FIG. 4 illustrates that users may only be able to see a portion of a fully displayable resource in a display window and that this forms a basis of computing their user display location within a resource and also illustrates an embodiment for computing user display locations (402 for user B, 403 for user A and 404 for user F), at which user identity tokens 409 may be placed. Referring to FIG. 4, it is apparent that users may have different user display locations 304 within a resource and this is illustrated at FIG. 4 which uses a shaded area to depict a fully displayable resource 401 for an identity of resource 303 of which each user can only see part in their relevant display window 301. For the sake of simplicity in FIG. 4, it is assumed that the size and display resolution of all users' display windows 301 are identical. However, when that is not the case, viewing user software 105 or other aspects of a system implementing an embodiment of the system may incorporate a sizing calculation that adjusts the user display location positional information to account for relative size differences in resource display areas and aspect ratios; a preferred embodiment of scaling factors is further discussed below in relation to FIGS. 7 and 8 with a worked example in FIG. 18. For example, referring to FIG. 4, the fully displayable resource 401 depicts the size of a display window 301 that would show all of the resource in question and is overlaid with the portion of the resource being displayed to user B at 402, user A at 403 and user F at 404. In FIG. 4, user B is looking at the top left of the fully displayable resource 401, user A is viewing a portion of the fully displayable resource 401 halfway down on the right and user F is looking at the bottom left of the fully displayable resource 401. The figure thus illustrates A, B and F are each viewing different parts of the same resource because their resource display software 102 can only fit part of the fully displayable resource 401 into their display windows 301.

In a preferred embodiment, the viewing user software 105 computes vertical positional parameters 1305 and horizontal positional parameters 1306 which, when combined with the identity of resource 303 comprise the positional parameters identifying a user display location 304. In a preferred embodiment, these positional parameters comprise offsets from the dead center of what the resource display software 102 would show as the top left of a resource and, in both the vertical and horizontal direction, comprise a proportional (percentage) offset and a scaling factor. Such scaling factor is, for the relevant direction, how many display windows 301 (of the size displaying the current resource) would be required to display the fully displayable resource 401. Any implementation of positional parameters and associated information is contemplated herein. For example, changes may be made to the point of reference for a user display location, offsets thereto, scaling information, aspect ratio, and to the coordinate conventions used. Generally positional parameters and associated information are used to convey position information relating a user and a resource and accordingly this information may be specified in any convenient manner.

For user B's user display location as illustrated in FIG. 4 402, both the vertical and horizontal positional parameter percentage offsets (1305A, 1306A) are zero because user B is looking at the top left of the fully displayable resource 401. The vertical positional parameter scaling factor 1305B for user B is 5 since it would take the height of 5 of user B's resource displays 302 to display all of the fully displayable resource 401. Similarly, the horizontal positional parameter scaling factor 1306B for B is 2 since it would take the width of 2 of user B's resource displays 302 to display all of the fully displayable resource 401.

For user A's user display location, as illustrated in FIG. 4, 403 the vertical positional parameter percentage offset 405 is 50% since A is looking halfway down the resource and A's horizontal positional parameter percentage offset 406 is 100% because they are looking all the way to the right of the resource. In this example, both vertical and horizontal positional parameter scaling factors (1305B, 1306B) are identical to B's. Similarly, user F's user display location 404 has a vertical positional parameter percentage offset 407 of 100% because they are looking all the way to the bottom if the resource and their horizontal positional parameter percentage offset 408 is 0% because they are looking at the leftmost part of the resource.

User display location 304 coordinates are thus computed by the viewing user software 105 and convey what is being displayed to a user through the identity of resource 303 being displayed with parameters accommodating the varying dimensions of fully displayable resources 401 and user's display windows 301. Viewing user software 105 may thus be capable of storing and transmitting, for each user computing device 101 on which is deployed, user display locations 304 for each resource display 302 in a display window 301 and for each resource tab within a display window 301 if tabs are supported by their resource display software 102. Viewing user software 105 may also be capable of receiving information in user data exchanges 106 from other user computing devices 101 and processing it to produce display maps 1704 as illustrated in the process flow at FIG. 2.

In a preferred embodiment viewing user software 105 may also transmit and may also receive and act on user data exchanges 106 containing additional parameters that affect other aspects of user actions, what information is displayed and how the information is displayed. When a user invokes the edit parameters option, shown in the flow illustrated at FIG. 2, the kinds of parameters editable in the preferred embodiment comprise types shown in FIG. 5.

Figure 5:
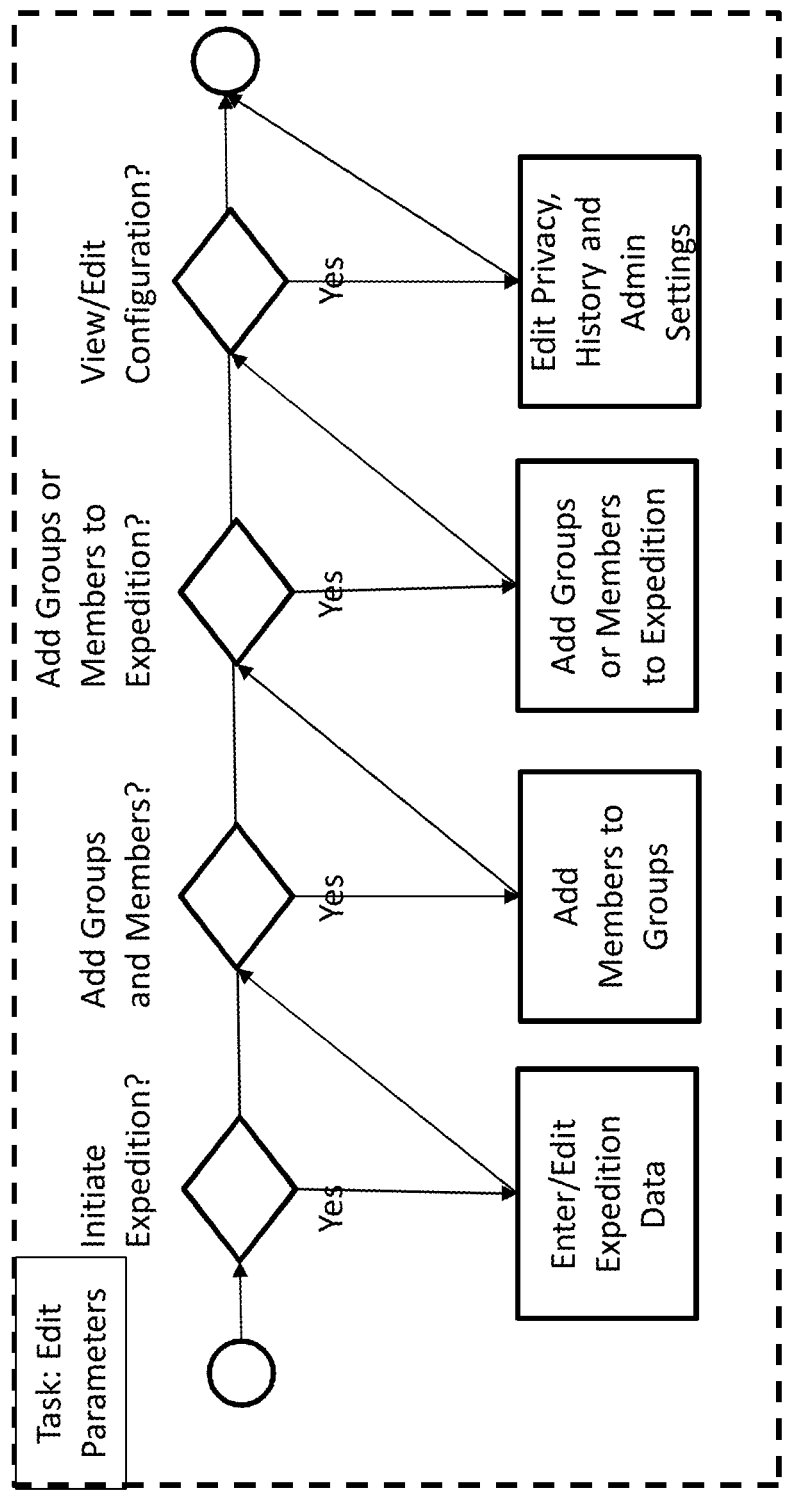
FIG. 5 is a flow chart for a process of editing parameters used in the viewing user software, according to an embodiment of the invention.

Selection of the "Initiate Expedition?" option shown in FIG. 5 allows a user to initiate an expedition. An expedition is defined as a user conducting resource viewing with the ability to share user display location 304 information using viewing user software 105. In initiating an expedition a user may define other users or groups of users who may participate in that expedition. Optionally, and illustrated in FIG. 15, the user may name that expedition so participants may readily tell from an adjustable expedition name zone 1502 which display window(s) 301 belong to that expedition and an indication of expedition purpose through a title which may be a hashtag. The user may also specify a starting identity of resource for an expedition 1501 and may establish and maintain a list of allowable resources to be viewed within that expedition. In the preferred embodiment, through these actions an expedition is initiated resulting in transmission of one or more user data exchange 106 transactions with an event type 1301 of "E" for an expedition create/edit event using a message data type of expedition initiation 1316 message and data content 1406 as indicated in FIG. 14.

In a preferred embodiment, expedition details can be modified by a user selecting the "Add Groups or Members to Expedition?" option within the process flow at FIG. 5 upon which viewing user software 105 would transmit user data exchanges 106 with the same event type of 1301 of "E" and a message data type of expedition name message 1317 to effect an expedition name change or message data type of expedition control message 1318 for other changes to users' expedition membership.

In a preferred embodiment, within the "Add Groups or Members to Expedition?" option an initiating user of an expedition automatically becomes the current expedition leader and the only one who may use viewing user software 105 to edit the details of that expedition. However, the current leader of an expedition may transfer some or all of the leader's rights to another user designated by them resulting in viewing user software 105 transmitting a user data exchange 106 with event type 1301 of "C" and a message data type of expedition control message 1318 and with the data content 1404 indicated in FIG. 14 for that event.

In a preferred embodiment, a user may leave an expedition by closing all relevant display windows 301 upon which viewing user software 105 will transmit a user data exchange 106 with an event type 1301 of "X" and a message data type of expedition exit message 1319 with the data content 1405 indicated in FIG. 14 for that event.

To facilitate users that wish to restrict use of viewing user software 105 and/or user data exchanges 106 to interactions with specific other users, users being represented by their user identity tokens 409 and associated information or groups thereof, a user may form sets of one or more users with viewing user software 105 using the "Add Groups and Members?" selection as illustrated in FIG. 5. In a preferred embodiment, groups of members may be defined by the user, either by identifying them individually in a list or using 'wildcard' terms (e.g. *@companyx.com) could make any user identity token 409 with an associated email address in the companyx.com domain a member of the group concerned and *.* would let any email address pass the test. Upon completion of an edit the viewing user software 105 transmits a user data exchange 106 with an event type 1301 of "G" for a group update edit event with a message data type of user group message 1314 having the data content 1403 indicated in FIG. 14 for that event. It should be noted that if the viewing user software 105 implementation does not require user group information to be transmitted to other users or a data exchange server 1101, it would just be kept in data storage 108 on the user's computing device 101.

In a preferred embodiment within the process flow at FIG. 5, a user may also use the "Add Groups or Members to Expedition?" option within the viewing user software 105 to control privacy settings restricting users that may or may not receive user data exchanges 106 from or including information about users or groups of users. A user may also specify users that are to be blocked from any participation and those whose participation may be limited, for example in a preferred embodiment one user could be barred from initiating comment messages 1309 related to an expedition and such restrictions can be applied by the user selectively to groups within an expedition by specifying the expedition the action is to be applied and/or to all expeditions they participate in. If the user is not the expedition leader the blocking or restriction will only be applied by their viewing user software 105 whereas an expedition leader's message can be applied by viewing user software 105 of all expedition members apply. These user control actions result in viewing user software 105 transmitting a user data exchange 106 with an event type 1301 of G, message data type of user control message 1310 comprising data contents at 1403.

In a preferred embodiment within the process flow at FIG. 5, the user may access administrative control functions of viewing user software 105 by selecting the "View/Edit Configuration?" which allows access to options for editing privacy, history and administrative parameters. In a preferred embodiment a user having system administrator rights over other users or who is the leader of an expedition may impose viewing user software 105 policy settings on users for which they hold such rights. For the purposes of this description, a system administrator means a person who has control over system settings on user's computing devices and software, typically to enforce system policies and rules for an organization. Imposing such policies can be important in corporate environments ensuring, for example, viewing user software 105 cannot be disabled for users within an organizational group so they will always be aware of each other's resource viewing activities, or ensuring viewing user software 105 cannot be used with participants outside the organization, or that such outside participants are limited. Policies may limit which users can initiate expeditions and which users can impose or lift limits on the resources that can be viewed within an expedition. After the user has edited the required configuration parameters in a preferred embodiment viewing user software 105 will transmit a user data exchange 106 with event type 1301 "A" and a message type of administrative control message 1311 with data content indicated in FIG. 14 for that event type 1407. When viewing user software 105 receives edited parameters that apply to them or for which the transmitting user has system administrator rights the new configuration parameters are applied by viewing user software 105. Where there is no system administrator imposing such policy, the user may edit such setting but the viewing user software 105 will only apply it to them.

Figure 18:
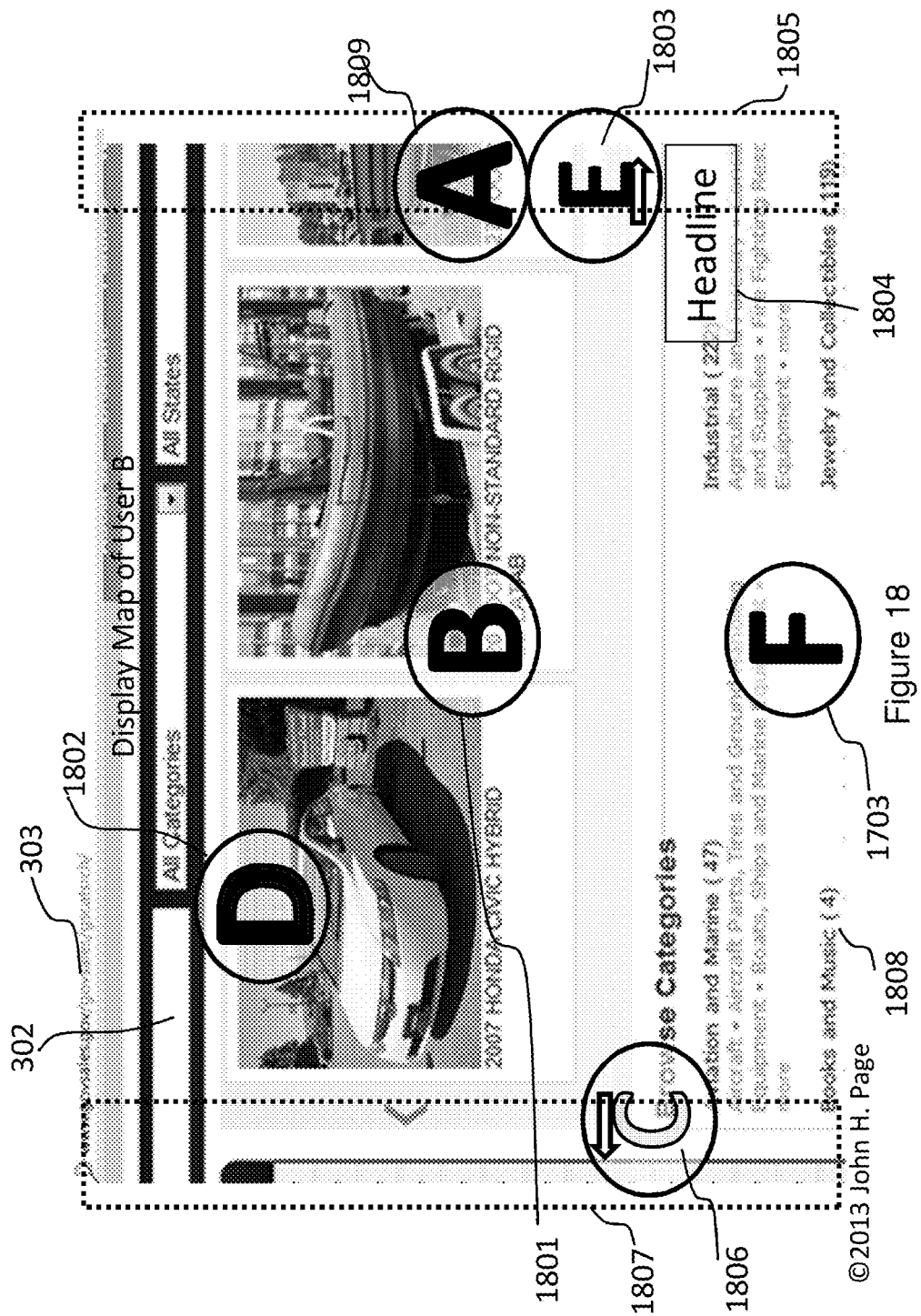
FIG. 18 illustrates a display map for user B after other users have changed user display locations subsequent to the situation illustrated at FIG. 17 with information about users that have not yet visited the currently displayed resource shown in an upstream display zone (indicated with dotted lines 1807) and information about users that have moved on to view a difference resource shown in an downstream display zone (indicated with dotted lines 1805).

In a preferred embodiment, configuration parameters may comprise reading direction so, for example, right and left are transposed in determining the positioning of user identity tokens 409. This is illustrated in FIG. 18 where the user identity token of user C 1806 indicates user C is viewing resources previously seen by the current user B. This is counter-intuitive for an Arabic language reader, for example, to whom this situation may be better portrayed by the user identity token of user C being on the right.

In a preferred embodiment a user may also update configuration parameters to limit which user data exchanges 106 containing user display location 304 information are used to update display maps 1704 from options comprising any time, from a fixed time, a time limit such as the past day or hour, the commencement of an expeditions, the last time they used the viewing user software 105 or their resource display software 102. In a preferred embodiment a user may also update configuration parameters so that the viewing user software 105, instead of computing a user's display location 304 using the center of the resource in a display window 301, uses the location of a user's display pointing device 109 within the relevant display window to compute user display location positional parameters 1304 communicated in user data exchanges 106. In a preferred embodiment a user may also set a threshold duration configuration parameter so when successive user data exchanges 106 from the same user show that an intervening user display location 304 has been visited for less than a threshold duration the user data exchange 106 containing that intervening user display location 304 may be ignored because the transmitting user has not had time to actually view the displayed resource i.e. they are merely passing through that location or have been redirected through it.

User privacy features are different than information sharing restrictions imposed in user group messages 1314, instead applying to an individual user's preferences. In a preferred embodiment, these individual user preferences are updated under the "View/Edit Configuration?" option in the process flow at FIG. 5. Such user policies comprise restrictions under which certain resources and identities of resource 303 are not to be shared by being transmitted by viewing user software 105 in user data exchanges 106, or a limited list is to be shared, and for sensitive data comprising passwords, PINs, address information, credit card information and for data retrieved in encrypted format, such as when using the hypertext transfer protocol (HTTP) over secure sockets layer (SSL) to achieve hypertext transfer protocol secure (HTTPS), to be removed prior to any onward transmission. An example circumstance is a user viewing resources from an electronic retailer's resource server computer 1001 that is an inventory of their past orders but with their user id and delivery address included—such personal information is generally not publicly available to any other user 1000.

In a preferred embodiment, for resource data typically communicated in an encrypted format, such as credit card details, and thus not available to the public, or for any resource where resource data may be dynamic or for any use of viewing user software 105 where it is necessary or desirable to transmit and/or keep a record of the actual resource 1002 received by a user, this can be shared by the user by re-transmitting it under a configuration option to strip out sensitive data prior to transmission to or retransmission from a user data exchange server 1101. Such retransmission would be sent by viewing user software 105 in a user data exchange 106 having an event type 1301 of "P" for private location update using a message data type 1308 of resource message 1312 with the data content 1402 indicated in FIG. 14 for that event, that user data exchange including the actual resources not publicly available but to be shared. Because the event type 1301 is "P" is used, the viewing user software 105 of the receiving user will know that the resource may be displayed from the resource message data content 1402 in the user data exchange 106 rather than retrieved using resource requests/responses 103. This approach, i.e. retransmitting resource message data, is generally not used due to network bandwidth considerations and may not, in any case, be desired where the user wishes to view what is received from a resource request/response 103 to a resource server 1001 directly.

History.

In a preferred embodiment, the invention allows a user to trace the path(s) of user display locations 304 followed by other users within an expedition including the option to show their comment messages and other actions. In a preferred embodiment, these history data features are accessed under the "View/Edit Configuration?" option in the process flow at FIG. 5 from which the user can browse through the history of user data exchanges 106 contained in data storage 108 or retrieved from a user data exchange server 1101 including display maps 1704 and filters to identify elements of interest.

If user data exchanges 106 need to be recovered, which may occur if a network connection is lost or a user joins an expedition sometime after its initiation, this may be accomplished in a preferred embodiment through viewing user software 105 using a user data exchange 106 with message data type 1308 of user data exchange history message 1315 which would retrieve the original user data exchange 106. All user data exchanges 106 contain a date/timestamp 1307 to facilitate accurate interpretation of the order of events.

Guide User.

In a preferred embodiment, viewing user software 105 may permit a non-human or human user with its own user identity token 409 to provide assistance and suggestions to the other users through a display map 1704. Such a user 1000 is called a guide user and it may perform all the functions a human user may invoke through viewing user software 105. For example, a guide user may use any information in an expedition's user data exchanges 106 to move between resources and provide links and other information using a message data type 1308 of comment message 1309 that are relevant to that expedition. A guide user's user identity token 409 may indicate in its appearance whether it is a guide user and where the guidance or guidance information is sponsored, this feature of the system may generate revenue from the links and other information it provides. Guide user settings are accessed using viewing user software 105 under the "View/Edit Configuration?" process flow at FIG. 5. in which the user may pick options to exclude use guide users or to limit guide users' participation in expeditions.

In a preferred embodiment, viewing user software 105 under the "View/Edit Configuration?" process flow at FIG. 5 provides for a user or system administrator to pick options and define appearance-related parameters for display maps 1704. These parameters can be used to control the sizing of user identity tokens 409, their opacity, the positioning of the display zones 1502, 1602, 1603, 1805, 1807 in which they appear, their shape, time related effects such as fading, persistence, blinking and diminishing to convey status including how recently they have been active and/or changed user display location 304 and to control display effects applied data available in user data exchanges 106.

Figure 10:
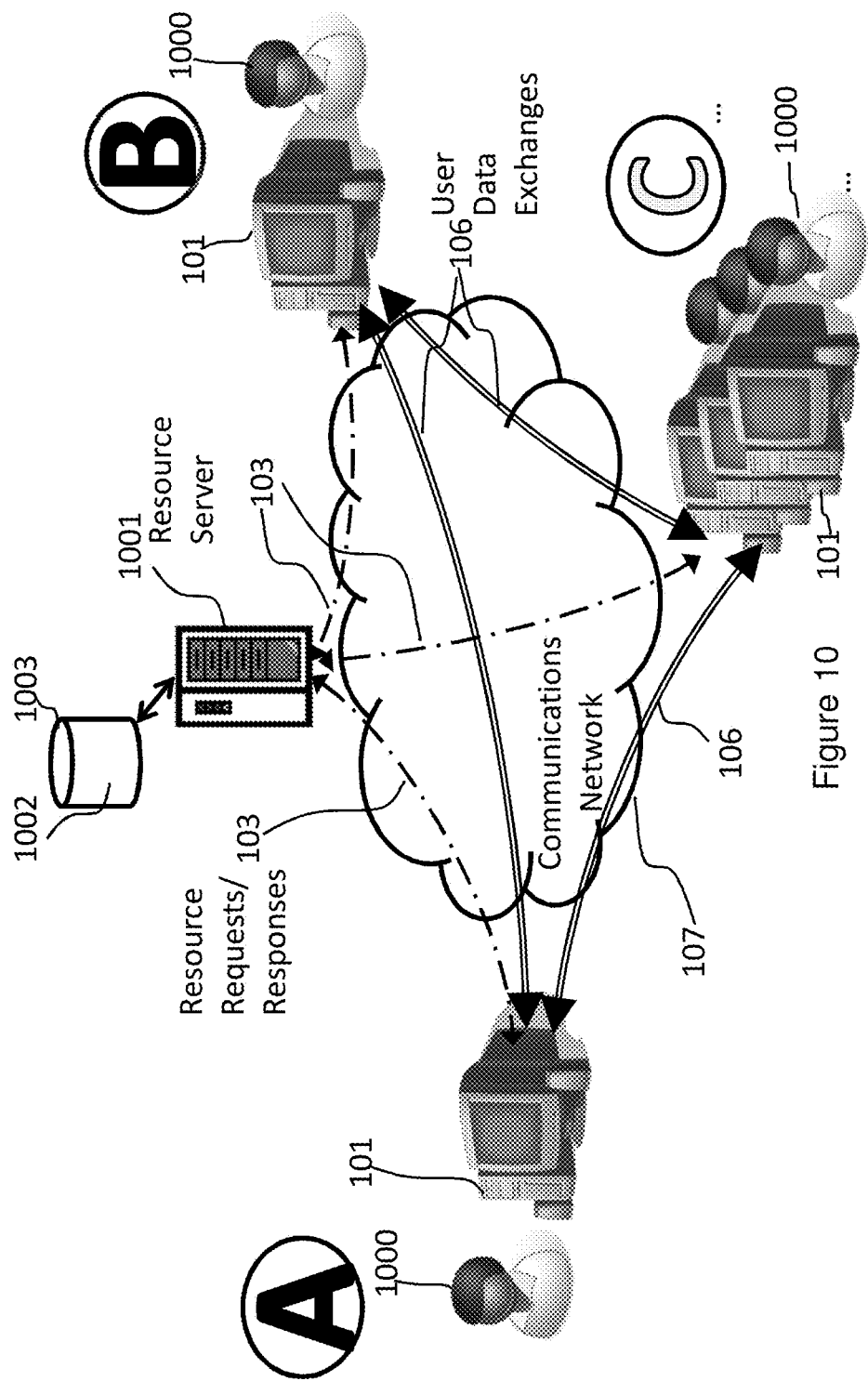
FIG. 10 shows a group of users and their computing devices running viewing user software to transmit and receive user data exchanges in a peer-to-peer networking mode i.e. directly with each other.
Figure 11:
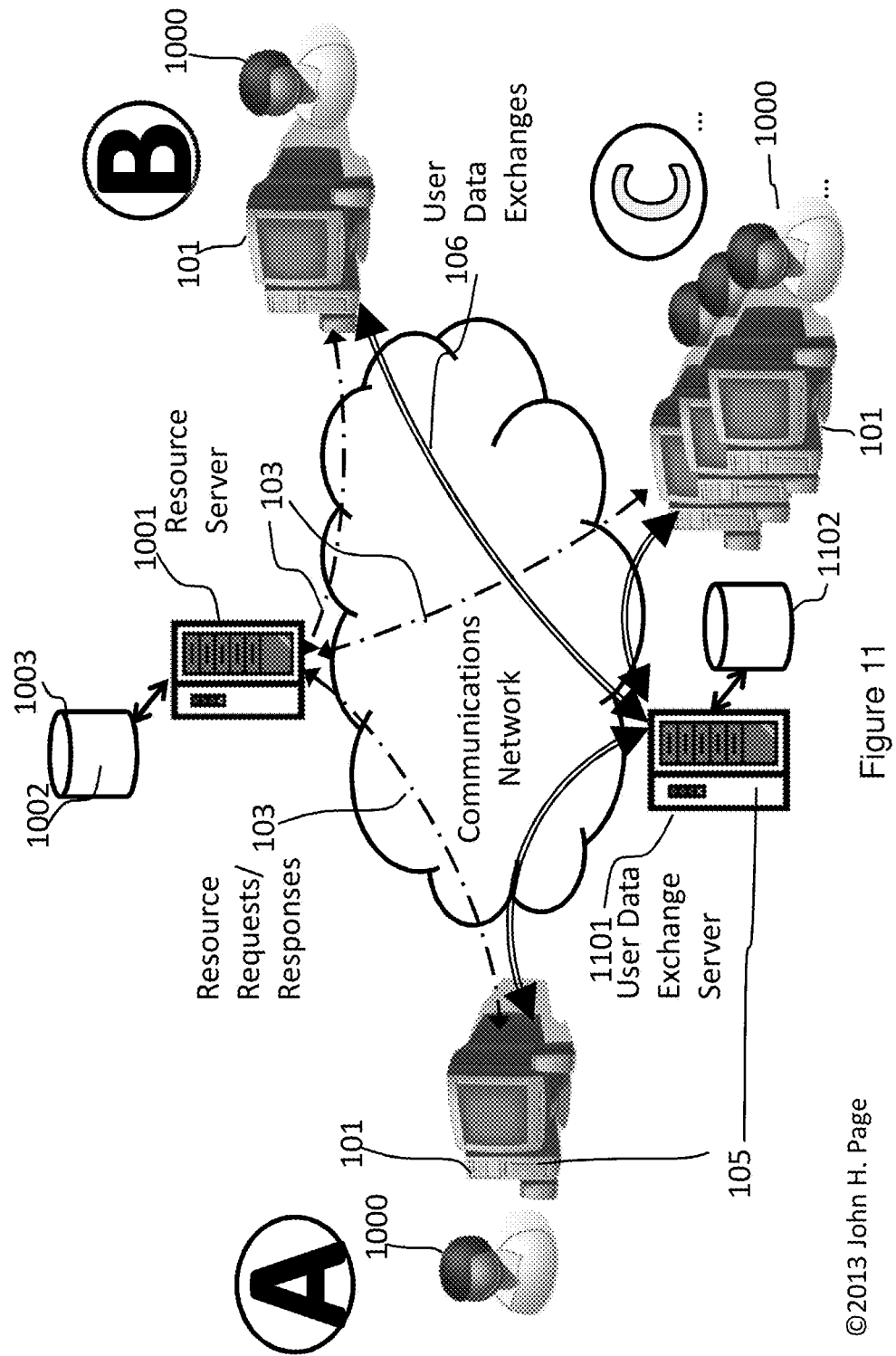
FIG. 11 shows a preferred embodiment of employing a user data exchange server to facilitate user data exchanges, copies of which are stored in a database.

Viewing user software 105 may be run on many user computing devices 101 concurrently with resource display software 102, and based on the resources being displayed on a user display 104 as a result of parameter edits and resource requests/responses 103, instances of the viewing user software 105 transmit and receive user data exchanges 106 that comprise information about users' viewing experiences and parameter edits of other users to customize the behavior of the viewing user software 105 running on the user computing devices 101, via a communications network either in peer-to-peer mode or server mode. These arrangements are illustrated in FIGS. 10 and 11 respectively.

Figure 6:
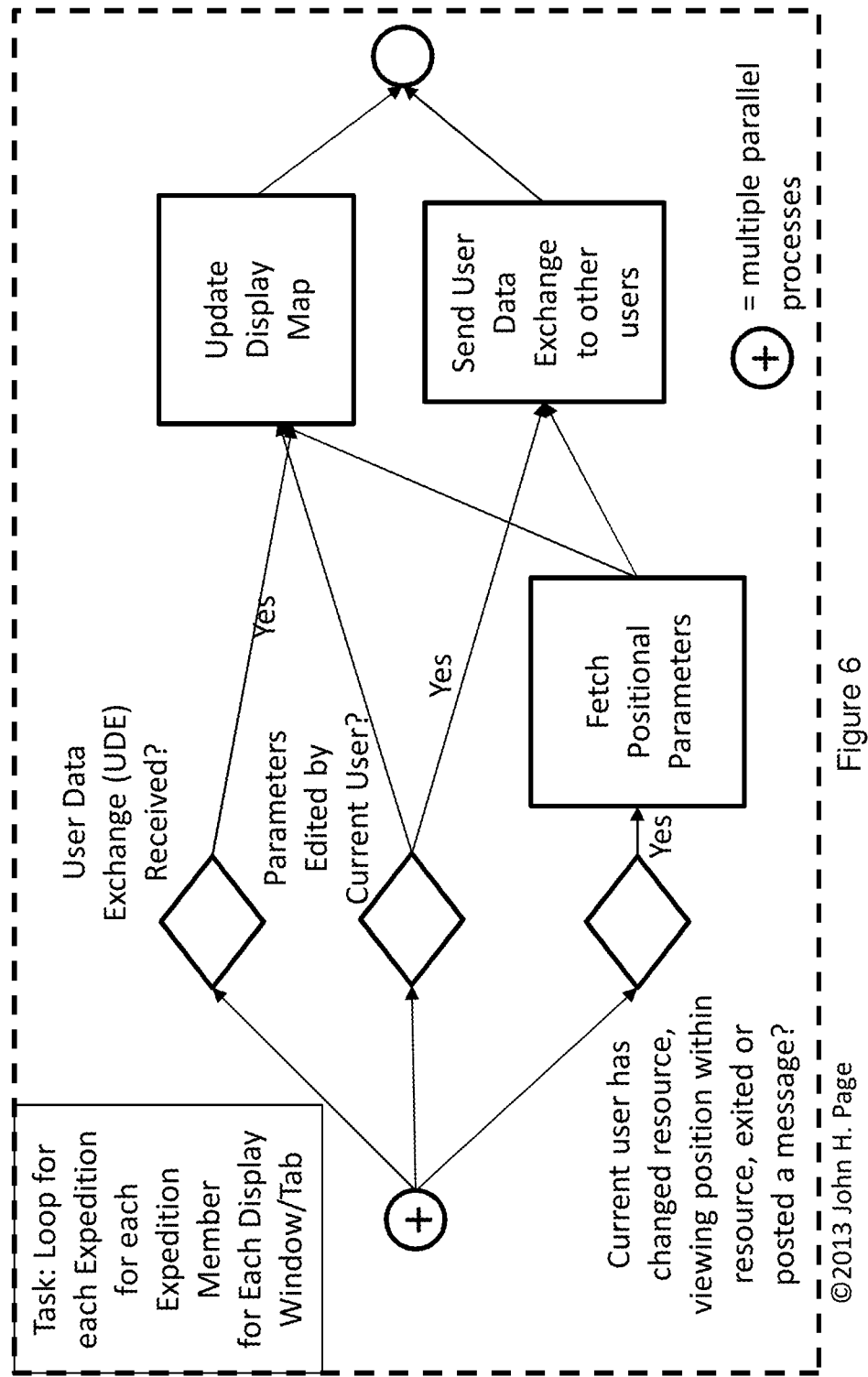
FIG. 6 is a flow chart for the processing and communication of events that can occur during resource viewing, according to an embodiment of the invention.

In its preferred mode, the viewing user software 105 operates on all user's computing devices 101 for all expeditions and their associated resource displays 302 and processes all user data exchanges 106 and other events affecting those displays. The flow in FIG. 6 illustrates this state of affairs for one user computing device 101 by showing a preferred embodiment of a top level processing loop within viewing user software 105 that detects all events that need to be processed. These events are categorized as changes from other users, in which case a user data exchange 106 is received, parameter edits by the current user resulting from the "Edit Parameters?" functions illustrated at FIG. 5 or the result of the current user moving their user display location 304 within a currently displayed resource or moving to a new resource. If the latter, the viewing user software 105 implements the "Fetch Positional Parameters" process flow further illustrated in FIG. 7 and described below. For events illustrated in FIG. 6, a display map 1704 impacted by the changed data is updated by the "Update Display Map" process which is further illustrated in FIG. 8 and described below.

Figure 7:
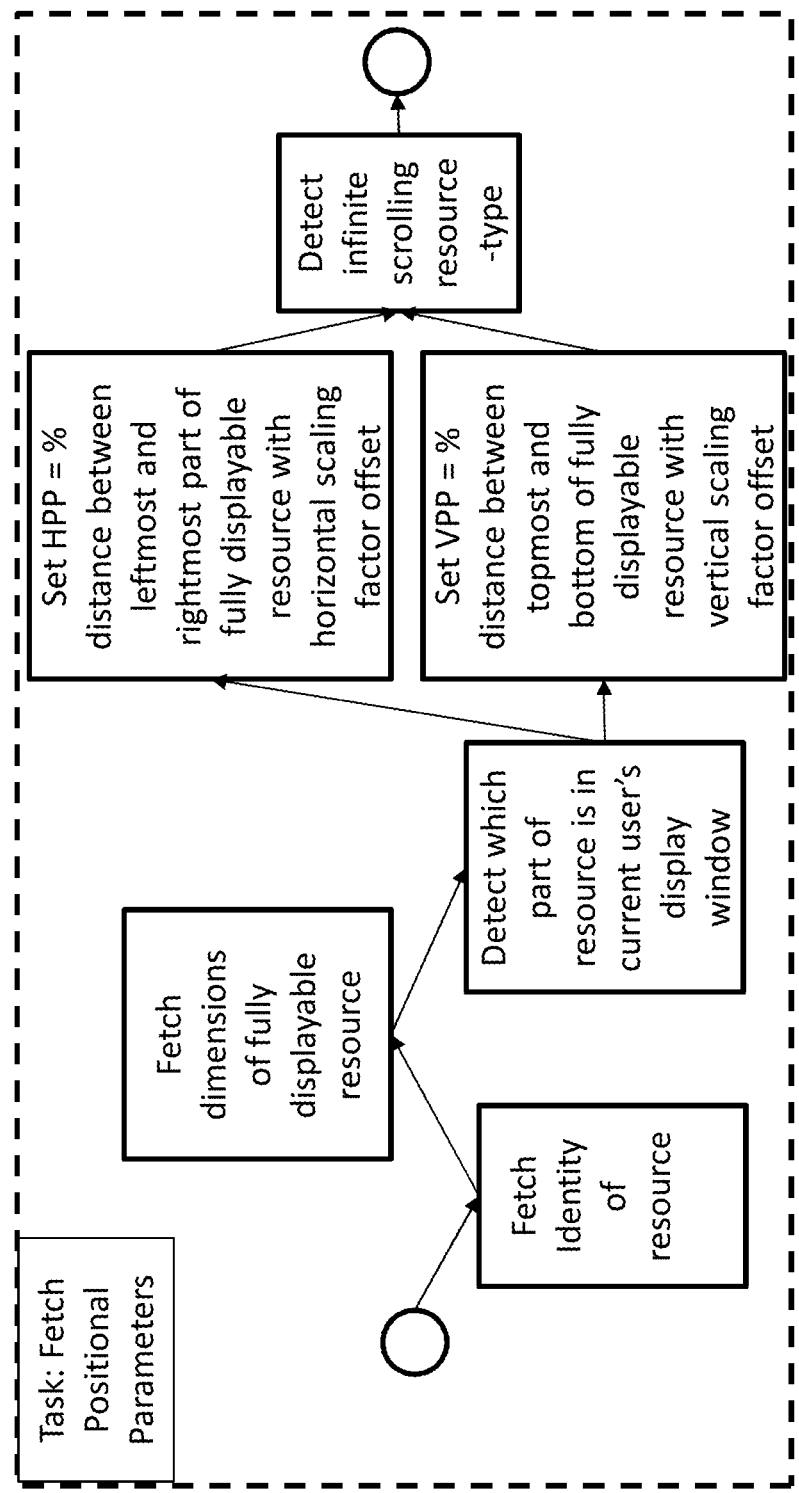
FIG. 7 is a flow chart for a process of deriving a user's display location in a preferred embodiment using Vertical Positional Parameters and Horizontal Positional Parameters, according to an embodiment of the invention.

In a preferred embodiment, viewing user software 105 retrieves updated user display location 304 information for the current user under the "Fetch Positional Parameters" process for which logical steps are illustrated at FIG. 7. First, an identity of resource 303 is obtained and the dimensions of that resource, when fully displayed, are calculated. Which part of the fully displayable resource is shown in the relevant display window 301 concerned is detected by the viewing user software 105 and in a preferred embodiment, this calculation is relative to the center of the displayed resource excluding any scroll bars or other non-resource frame, navigation or menu-related information. The user's horizontal and vertical positional parameters within the fully displayable resources are computed as previously described. Some resources may embed a so-called infinite or endless scrolling feature in which case the height of the fully displayable resource is not immediately apparent and will not be until such infinite scrolling is completed. Where such feature is detected this may be flagged in a user data exchange 106 and used as additional information in constructing a display map 1704.

Figure 8:
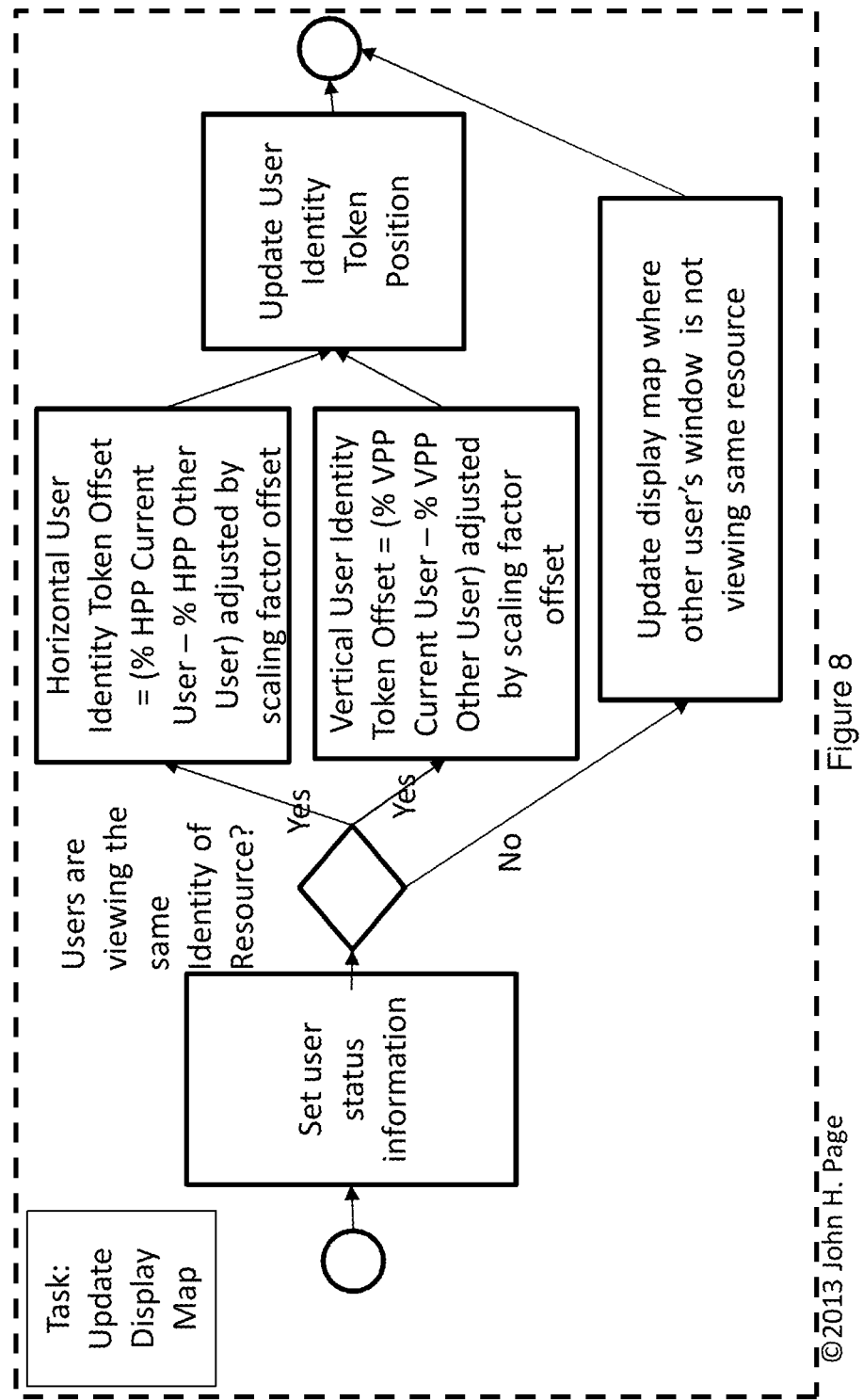
FIG. 8 is a flow chart showing key steps in updating a display map, according to an embodiment of the invention.
Figure 9:
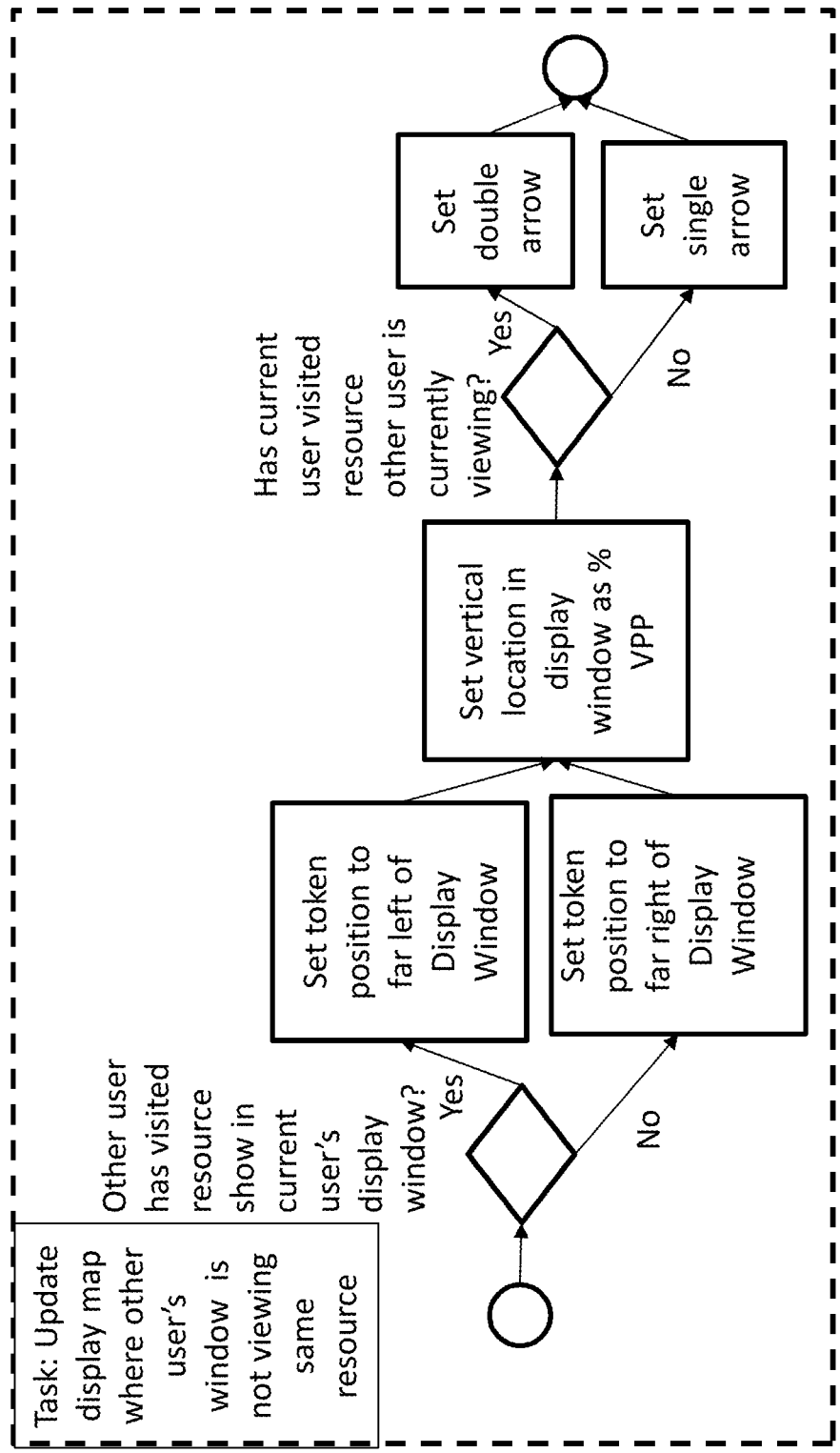
FIG. 9 is a flow chart showing steps for updating the zones in a display map specifically for users that are not viewing the same resource as the current user, according to an embodiment of the invention. A preferred embodiment is illustrated for a language read from right to left and using differently styled arrows to convey users' relative resource viewing histories.

In a preferred embodiment, viewing user software 105 updates display maps 1704 with information pertaining to users that are members of the expedition concerned and this process is illustrated by the process flow at FIG. 8. In a preferred embodiment, user status information such as the time they have been at the current resource, comment messages made and how many different resources they have visited, is first determined from the available user data exchanges 106. The position within the resource display 302 at which a user's identity token 409 is shown is thus derived intersubjectively, that is, it is computed using both the current user's display location and the other user's display location. If the other user is viewing a different resource than the current user the sub-process "Update display map where other user's window is not viewing same resource" may be invoked as illustrated in FIG. 9. Otherwise, viewing user software 105 calculates the display offsets used in positioning of the other user's user identity token 409.

In a preferred embodiment, in the sub-process "Update display map where other user's window is not viewing same resource", illustrated at FIG. 9, viewing user software 105 computes the horizontal positioning of the other user's identity token depending on both a) whether the other user is viewing a resource that the current user has viewed and b) whether the current user is viewing a resource that the other user has viewed. Additionally, the vertical positioning may be calculated based on the other user's vertical positional parameters within the resource they are viewing and the viewing user software 105 also employs a combination of user identity token 409 positioning and styled symbols to graphically indicate these circumstances.

In a preferred embodiment, viewing user software 105 operates in the environment depicted in either FIG. 10 (peer-to-peer mode) or 11 (server mode). In either of these environments, users 1000 through their computing devices 101 running viewing user software 105 with user displays 104 are attached to a communications network 107 via which they access resources 1002 stored on storage devices 1003 attached to resource server computers 1001 using resource requests/responses 103.

In a preferred embodiment, viewing user software 105 is used in a server mode as illustrated in FIG. 11 employing a user data exchange server 1101 which stores user data exchanges 106 on an attached storage device 1102. The server mode is preferred since, especially for larger groups of users 1000, it reduces communications network 107 load and also facilitates recovery of user data exchange 106 histories if there are network connectivity issues or a user 1000 joins or re-joins an expedition after user data exchanges 106 have already taken place.

In a preferred embodiment, viewing user software 105 uses user data exchanges 106, whether residing on a user data exchange server 1101 or maintained in data storage 108 on a user computing device 101, to perform the processes required to produce display maps 1704 according to configuration data. Under the server model in FIG. 11 some or all functionality otherwise carried out by viewing user software 105 on user computing devices 101 may be carried out on a user data exchange server 1101.

Figure 12:
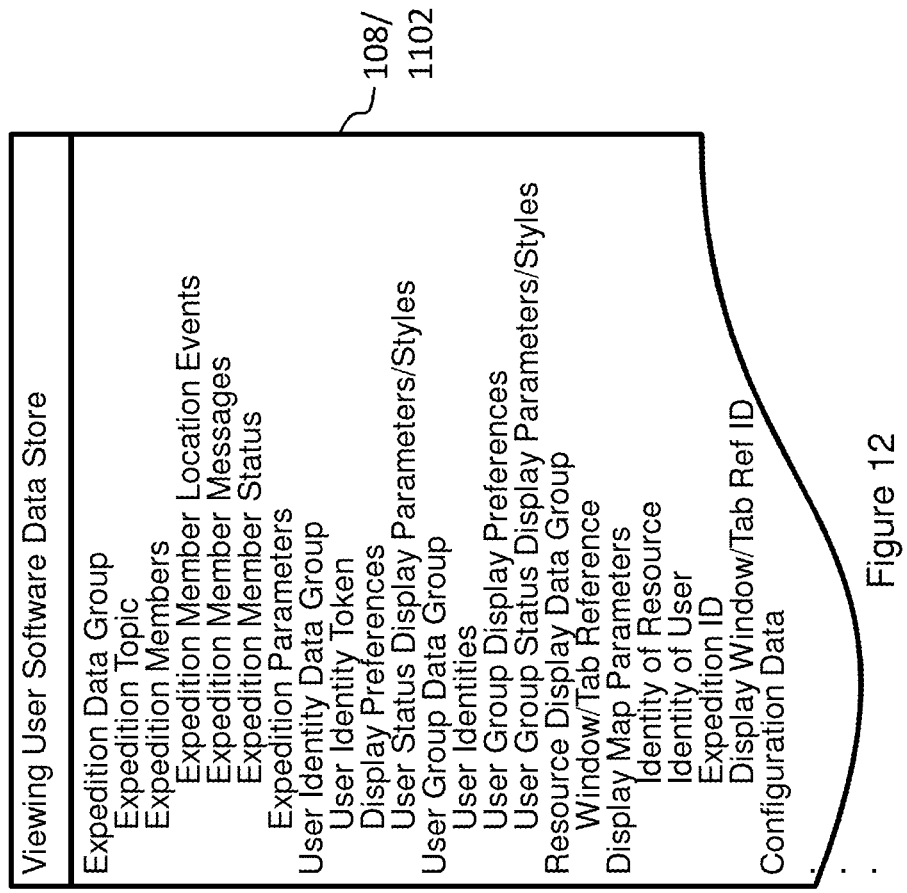
FIG. 12 shows a user data exchange data store, located in a user's computing device and/or user data exchange server, comprising types of data from user data exchanges.

In a preferred embodiment, the data used by viewing user software 105 is organized into groups as illustrated in FIG. 12. The main groups illustrated are expedition data, user identity data, user group data, resource display data and configuration data.

Figure 13:
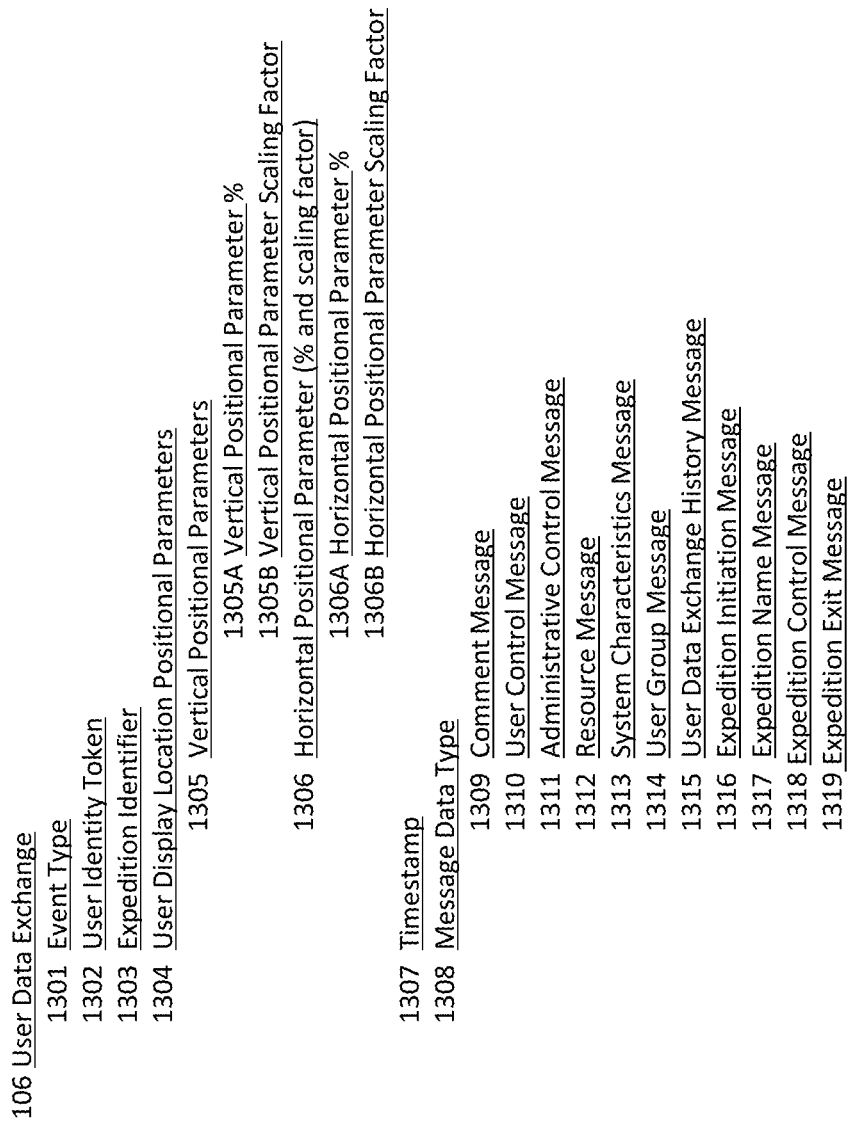
FIG. 13 shows user data exchanges in a preferred embodiment comprise an event type field indicating what has triggered a user data exchange and the type of message data may vary according to an event type field.

In a preferred embodiment, user data exchanges 106 contributing to the data store 108 used by viewing user software 105 comprise different message data types 1308 with different data 1301 to 1319 (see FIG. 13) or combinations thereof depending on the user action to be conveyed, the latter being indicated by an event type element 1301 which, for example, differentiates between an action that adds or removes group members and an event signaling that a user has exited. The event data table at FIG. 14 shows key data items for certain event types 1301 in which user's user identity tokens 409 or reference thereto serve to identify them in the display maps 1704. All user data exchanges 106 contain at least one user identity token 409 which is that of the transmitting user 1302. User data exchanges 106 include an expedition identifier 1303 to differentiate between interactions with multiple users and groups of users through multiple instances of user's resource display software 102. In a preferred embodiment, the sharing of an identity of resource 303 currently being viewed occurs by the user's viewing user software 105 triggering transmission of a user data exchange 106 having an event type 1301 of "L" for location update and with data content 1401 indicated in FIG. 14 for that event.

User data exchanges 106 in a preferred embodiment contain user display location data 1401 and 1402 and are carried out in real-time or near real-time to convey user display locations 304, derived from what the transmitting user is viewing on their resource display 302. In a preferred embodiment, the display location of a user identity token 409 is computed using the identity of resource 303 plus their user display location positional parameters 1304 comprising vertical positional parameters (for example, the percentage amounts at 405, 407 for users A and F respectively both with a vertical scaling factor of 5) and horizontal positional parameters (for example, the percentage amounts at 406, 408 for users A and F respectively both with a horizontal scaling factor of 2). This information from user data exchanges 106 is used by viewing user software 105 to construct display maps (see examples at FIGS. 17 1704, 18 1808 and 19 1909) in real-time or near real-time in display windows 301. Display maps 1704 comprise a resource display 302 and user identity tokens 409 placed within display zones 1502, 1602, 1603, 1805, 1807 at positions relative to the viewing user's user display location 304 following user display position rules described in more detail below.

Through positioning and display of user identity tokens 409 and associated information, display maps 1704 provide users an intersubjective awareness of the location of other users relative to the resource display 302 in their display window 301 and this is accomplished by viewing user software 105 mapping user display locations 304 and other data elements in user data exchanges 106 to derive the appearance, positioning of and style of symbols on users' user identity tokens 409 superimposed on a resource display 302. The examples provided show a preferred embodiment's use of partial transparency to ensure that underlying resources are not obscured by user identity tokens 409. A resource display 302 might only show part of a fully displayable resource 401 and hence, for the purposes of this description, that user's display location 304 is reckoned using the dead center of their resource display 302 within the display window 301 concerned.

In a preferred embodiment, user display position rules implemented by viewing user software 105 are applied to all unblocked users in an expedition. User display location 304 positional parameters 1304 are expressed as ratios to work around the varying characteristics of user display devices 104 attached to a user's computing device 101, resource display software 102 variations and other system settings. User display location positional parameters 1304 in a preferred embodiment are defined as vertical positional parameters 1305 comprising a percentage vertical offset 1305A within the fully displayable resource and a vertical scaling factor 1305B and horizontal positional parameters 1306 comprising a percentage horizontal offset 1306A within the fully displayable resource and a horizontal scaling factor 1306B. The display positions of user identity tokens 409 are derived using other user's user display locations 304 extracted from their user data exchanges 106 compared to the current user's user data exchanges 106. The preferred derivation by viewing user software 105 of a user display location 304 is described above as illustrated at FIG. 4 with multiple examples of resulting display maps 1704 in FIGS. 16 through 19 and as further described below.

Figure 16:
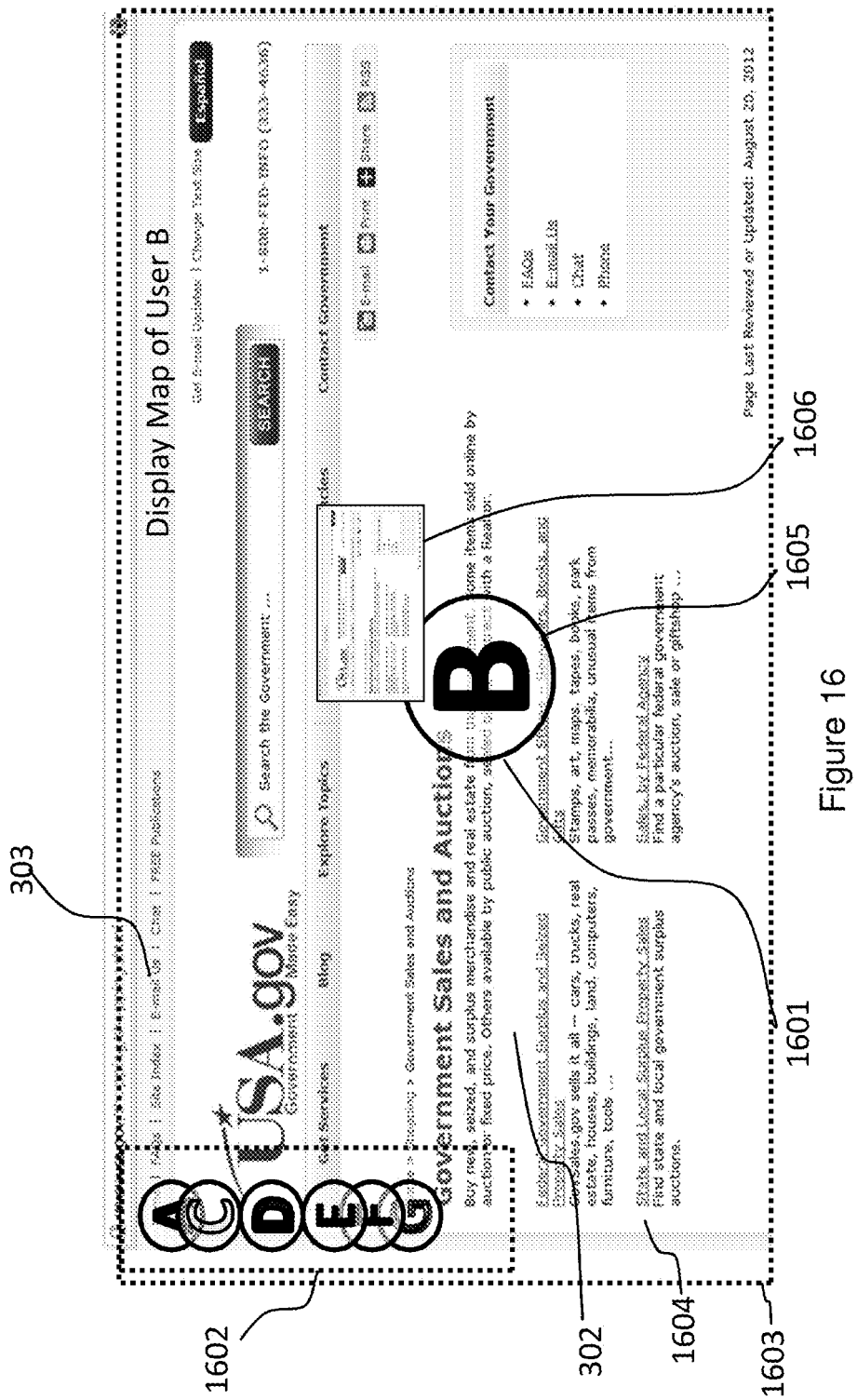
FIG. 16 illustrates a display map for user B at the initiation of an expedition, B's user identity token being shown within a user location display zone (indicated with dotted lines 1603) and other user's tokens within an 'inactive' zone (indicated with dotted lines 1602).
Figure 19:
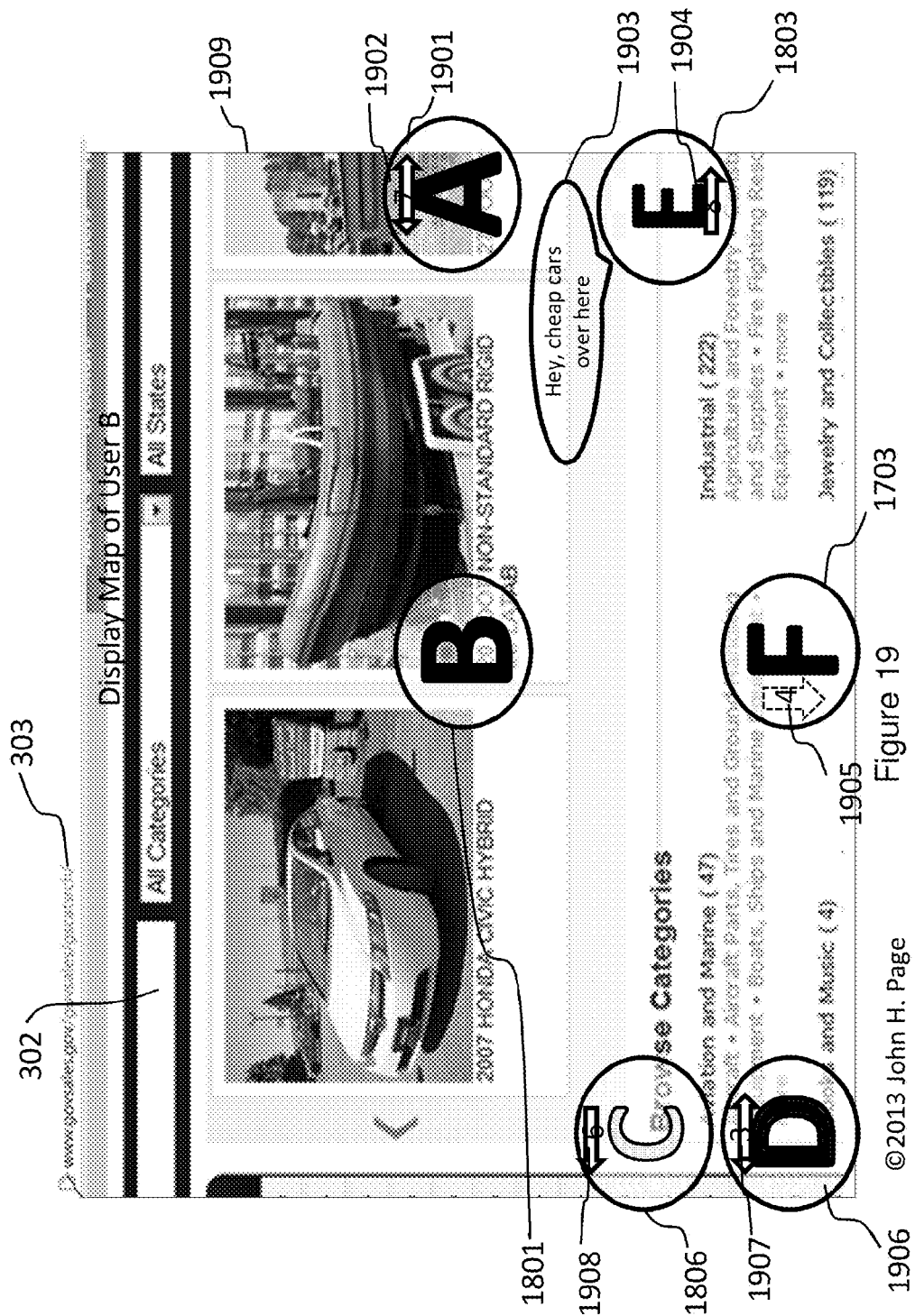
FIG. 19 illustrates a display map for user B display subsequent to FIG. 18 with additional display variations.

The user display position rules for the preferred embodiment of the invention depend on whether the other user:

a. is inactive, which may be indicated by showing a diminished size user identity token 409 toward the top left of a user's display window 301 in an inactive zone 1602. FIG. 16 exemplifies this situation, showing a display maps 1704 at the commencement of an expedition initiated by user B. At commencement the resource display 1604 is rendered and may be overlaid by viewing user software 105 with information from the user and from user data exchanges 106. In this example, no user data exchanges 106 have yet been received from other users so their user identity tokens 409 are diminished in size and placed in an inactive zone 1602;

b. has not yet visited the resource display 302 the current user is viewing but the current user has visited the resource display 302 the other user is viewing. This condition may exist when the identity of resource 303 the current user is viewing does not exist in the user data exchanges 106 of the other user but the identity of resource 303 the other user is viewing does exist in the user data exchanges 106 of the current user. This set of conditions may be indicated by showing the other user's user identity token e.g. user C 1806 with a symbol 1908 indicating they are not viewing the displayed resource 302 of the current user, which may also comprise any style of progress indicator of how many different resources or jumps between resources have taken place between the relevant user data exchanges 106, but an identity of resource 303 previously viewed by the current user at a horizontal user display position all the way to the left-hand side in an upstream display zone 1807 (regardless of the horizontal positional parameters 1306 in the other user's latest data exchange 106) of the current user's display window 301 with a vertical display position equivalent to the other user's vertical positional parameters 1305 in relation to the height of the current user's display window 301. However, any technique may be used as a convention to indicate this and other user statuses. FIG. 18 exemplifies this situation with user C's user identity token 1806 in the upstream display zone 1807 to the left of user B's user location display zone 1808 with a left pointing arrow showing user B has viewed the identity of resource 303 currently being viewed by C but that user C has not viewed the identity resource 303 being viewed by user B;

c. has not yet visited the resource the current user is viewing and the current user has not visited the resource the other user is viewing. This condition exists when the identity of resource 303 the current user is viewing does not exist in the user data exchanges 106 of the other user and the identity of resource 303 the other user is viewing does not exist in the user data exchanges 106 of the current user. This set of conditions may be indicated by showing the other user's user identity token e.g. for user E at 1803 with a symbol 1904 indicating they are not viewing the currently displayed resource but are viewing a resource not previously viewed by the current user, which may also comprise any style of progress indicator as to how many different resources or jumps between resources have taken place between the relevant user data exchanges 106, at a horizontal user display position in a downstream display zone 1805 all the way to the right-hand side (regardless of the horizontal positional parameters 1306 in the other user's latest data exchange 106) of the current user's display window 301 with a vertical user display position equivalent to the other user's vertical positional parameters 1305 in relation to the height of the current user's display window 301. FIG. 18 exemplifies this situation in which user E's user identity token 1803 is displayed in the downstream display zone 1805 on the right of user B's user location display zone 1808 with a right-pointing arrow to indicate user E has previously viewed the resource currently being viewed by user B but user B has not viewed the resource being viewed by user E;

d. has previously viewed the resource the current user is viewing and the current user has not visited the resource the other user is viewing. This condition exists when the identity of resource 303 the current user is viewing exists in the user data exchanges 106 of the other user but not in the most recent one and the identity of resource the other user is viewing does not exist in the user data exchanges 106 of the current user. This set of conditions may be indicated by showing the other user's user identity token e.g. for user A at 1901 with a symbol 1902 indicating they are not viewing the current resource but a resource previously viewed by the current user, which may also comprise a graphic or numeric progress indicator of how many different resources or jumps between resources have taken place between the relevant user data exchanges 106, at a horizontal user display position in a downstream display zone 1805 all the way to the right-hand side (regardless of the horizontal positional parameters 1306 in the other user's latest data exchange 106) of the current user's user display map 1909 with a vertical user display position equivalent to their vertical positional parameters 1305 in relation to the height of the current user's display window 301. FIG. 19 exemplifies this situation showing user A's user identity token 1901 in the downstream display zone 1805 to the right of user B's resource display 302 with a double headed arrow showing they have viewed the identity of resource currently being viewed by B, (determined by examining the user data exchanges 106 transmitted by user B) but user B has not viewed the identity of resource being viewed by user A;

e. has previously visited the resource the current user is viewing and the current user has visited the resource the other user is viewing. This condition exists when the identity of resource 303 the current user is viewing exists in the user data exchanges 106 of the other user but not the most recent one and the identity of resource the other user is viewing does exist in the user data exchanges 106 of the current user. This set of conditions may be indicated by showing the other user's user identity token e.g. for user D at 1906 with a symbol 1907 indicating they are not viewing the current resource but are viewing a resource not previously viewed by the current user, which may also comprise a graphic or numeric progress indicator of how many different resources or jumps between resources have taken place between the relevant user data exchanges 106, at a horizontal user display position all the way to the left-hand side (regardless of the horizontal positional parameters 1306 in the current other user's latest data exchange 106) of the current user's display window 301 with a vertical user display position equivalent to the other user's vertical positional parameters 1305 in relation to the height of the current user's display window 301. FIG. 19 exemplifies this situation showing user D's user identity token 1906 displayed in the upstream display zone 1807 to the left of user B's display map 1909 with a double headed arrow to indicate user D has previously viewed the current identity of resource 303 and user B has previously viewed the resource being viewed by user D;

f. is viewing the same resource the current user is viewing, in which case the position of the transmitting user's user identity token 409 is within the user location display zone 1603 where the transmitting user's user display location 304 is adjusted relative to the center of the current user's display window 301 (since that is the middle of what the current viewer is seeing). In the preferred embodiment, assuming all users' display location vertical and horizontal positional parameters scaling factors (1305B, 1306B) are equal so no scaling factor offset needs to be applied, those relative adjustments are, with negative percentages being below (vertical) and to the left (horizontal) of the center of the current user's display window 301:

i. the current user's vertical positional parameter percentage 1305A minus the other user's vertical positional parameter percentage 1305A with the result adjusted by a vertical scaling factor offset derived from the vertical positional parameter scaling factors of both users;

ii. the current user's horizontal positional parameter percentage 1306A minus other said user's horizontal positional parameter percentage 1306A with the result adjusted by a horizontal scaling factor offset derived from the horizontal positional parameter scaling factors of both users.

Figure 17:
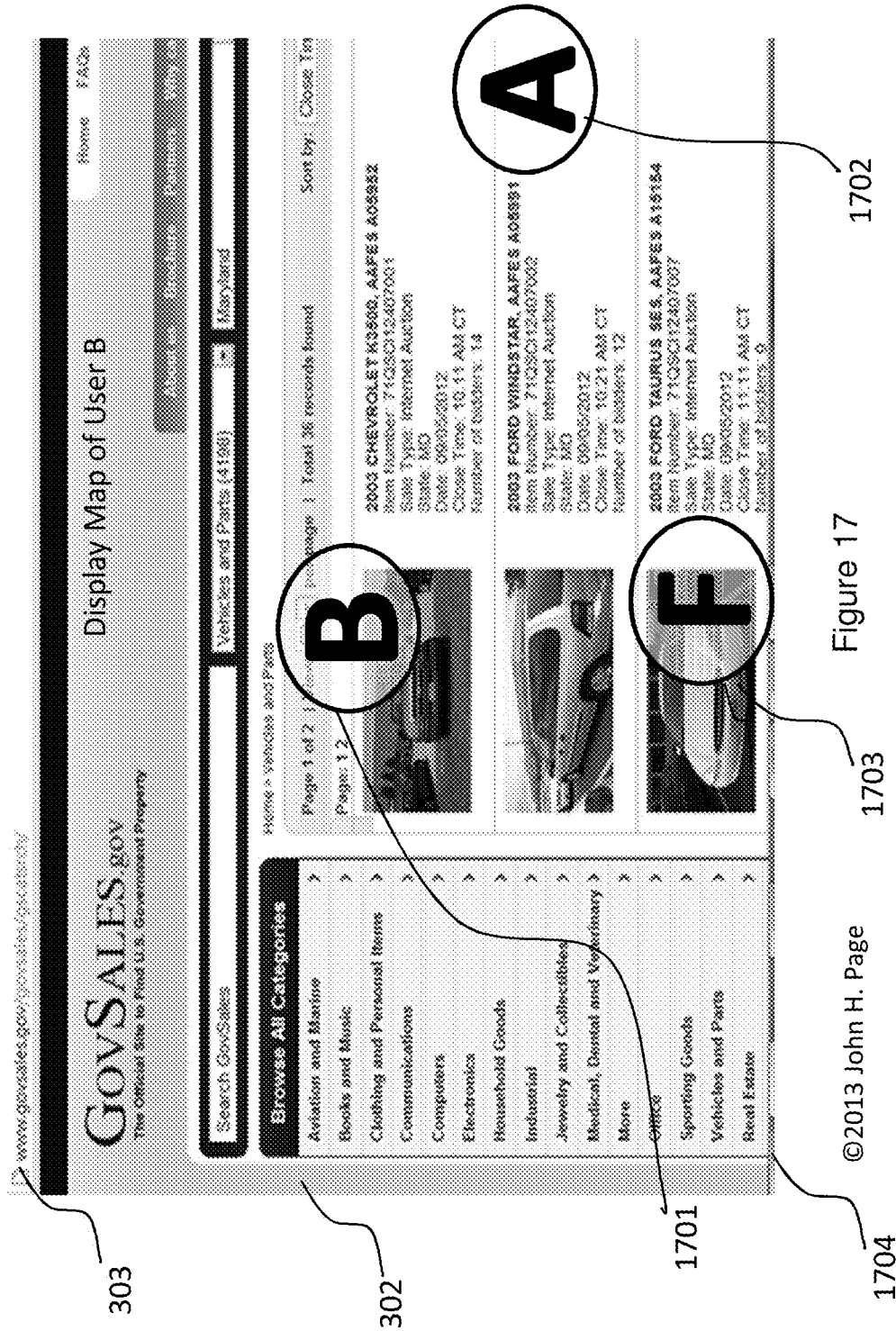
FIG. 17 illustrates a display map for user B with user identity tokens for Users A, B and F computed from their user display locations received in user data exchanges.

In a preferred embodiment, scaling factor offsets provide adjustments in the generation of display maps 1704 to allow for variations in user's displays 104 and the sizing of display windows 301 on those displays. FIG. 17, as an example of a preferred embodiment in this regard, shows a display map 1704 in which, user B is looking at the top left of the fully displayable resource 401 with has a user display location 402 within that resource. B's user identity token 1701 is in the middle of the display map 1704 because the resource display 302 is what they are actually looking at—their user display location 402 is at vertical and horizontal positional parameter percentage offsets of 0% and 0% relative to the center of their resource display 302. As user B's scaling factors within its user display location positional parameters 1304 are identical to his/her own, there is no scaling factor offset to be applied. The positioning of the user identity tokens of users A 1702 and F 1703 on this display map 1704 is derived from their user display locations (403 and 409 respectively) as described for FIG. 4; user B is at the top left of the resource so his/her vertical and horizontal positional parameter percentages (1305A, 1306A) are 0% and 0% respectively; user F is viewing the bottom (vertical positional parameter percentage=100%) left (horizontal positional parameter percentage=0%) of the fully displayable resource 401 so F's vertical display position is 0%-100%=-100% and their horizontal display position is 0%-0%=0%. These relative position percentages are applied from the center of the resource display 302 hence user F's user identity token 1703 is at the bottom of the user location display zone 1603 of user B's display map 1704 directly underneath the user identity token of user B 1701. User A, however, is viewing the far right (horizontal positional parameter percentage=100%) of the fully displayable resource 401 half way down (vertical positional parameter percentage=50%) so A's vertical display position is 0%-50%=-50% and their horizontal display position is 0%-100%=-100% hence user B's display map 1704 shows user A's user identity token 1702 halfway between his/hers and the bottom of this resource display 302 but all the way over to the right. As with user F, the vertical and horizontal positional parameter scaling factors are identical between user B and user A so there is no scaling factor offset to be applied.

In a preferred embodiment, computation of user identity token 409 positioning can further be seen in FIG. 18 where user D's user identity token 1802 is displayed above and to the left of B's user identity token 1801. They are viewing the top left of the same resource and so both have vertical and horizontal positional parameter percentages (1305A, 1306A) of 0% and 0%. However, while user B's display window is only showing one fifth the height and half the width of the fully displayable resource 401, D's display window 301 displaying this resource is only displaying one tenth the height and one quarter the width. In other words, B's vertical and horizontal positional parameter scaling factors (1305B, 1306B) are 5 and 2 compared to D's respective values of 10 and 4. If the scaling factors had been identical, user D's user identity token 1802 would have been at the same position within the user location display zone 1808 as B's. In this example of the preferred embodiment, the viewing user software 105 applies offsets under the process flow described previously and illustrated at FIG. 7. The vertical positional parameter scaling factor offset is $^5/_{10}$=one half and the horizontal positional parameter scaling factor is $^2/_4$=one half thus D's user identity token 1802 appears halfway between where it would have been and the top of the user location display zone 1603 and halfway between where it would have been and the left edge of the user location display zone 1603.

In a preferred embodiment, when a user changes what they are viewing using their resource display software 102 their position on a user display map 1704 may be changed by the viewing user software 105 in real-time on near real-time relative to each current user. In the case, for example, the user A now moves to view the top right of the fully displayable resource 401 the viewing user software 105 will move their token from its location in FIG. 17 1702 to its location in FIG. 18 1809. A's user display location positional parameters 1304 will be updated by user A's viewing user software 105 and a user data exchange 106 transmitted and received over the communications network 107 by user B's viewing user software 105, which will update the display map to that in FIG. 18.

Regarding user comment messages on display maps, in addition to seeing each other's user identity tokens 409 on a display map 1704, in a preferred embodiment viewing user software 105 provides for users to transmit user data exchanges 106 that communicate comments which are shown on display maps 1704 in the context of their user display location 402. FIG. 19 exemplifies this 'shoutout' feature showing a comment message by user E 1903. In the example a comment message 1309 received in a user data exchange 106 is associated by viewing user software 105 with user E's user identity token 1803 and shown in proximity to it. Where a user wishes to make a comment about the content at a specific location within a resource (say, a price in an online shop), viewing user software 105 provides the option (instead of using the position of the center of their resource display) to anchor that message at the location they select using their display pointing device 109 (e.g. keyboard cursor, mouse arrow) and in a preferred embodiment a comment message comprises user display location positional parameters 1304 for that comment location as part of the comment message 1309. Other types of comment messages than just text may be displayed containing images or hyperlinks to videos, reference data (for example, a comparable shopping deal) and other object types that the transmitting user feels is relevant. In a preferred embodiment, comment messages 1309 may be markers or conversational, the former remaining in the place the originating user was when they generated it with an indication of the author; conversational messages move with the user identity token 409 they are associated with. Furthermore, in a preferred embodiment, comment messages 1309 may have limited display lives or be replaced by more recent comment messages and comment messages 1309 may be directed to one or more specific users, not necessarily to all users in an expedition. Comment messages 1309 may refer to or be in response to other comment messages in which case they will be displayed in the same shoutout but shown either stacked or provide symbolic annotation to the comment by agreeing or disagreeing with it. In a preferred embodiment, a user following a hyperlink embedded within other user's user identity token 409 will have the option of having that action update the current display window 301 or shown in a new display window 301.

Regarding resource headlining, in a preferred embodiment, display of a user identity token 409 of a user not viewing the same resource as the current user may be augmented with a system generated headline or other summary of the resources they are currently viewing. This is illustrated in FIG. 18 where user C's identity token 1803 is accompanied by a box containing a headline 1804. Similar to resource previews 1606, headlining may be suppressed or configured, for example, only to be shown upon a rollover or through a pointing device.

Regarding a display position not being completely known, which may occur, for example, when a resource contains a so-called endless scrolling feature where the complete resource is not returned in the immediate response to a resource request 103 but, when said user has reached the bottom of the resources 1002 provided in the current response from the resource server 1001, a further resource request and response 103 may be automatically generated by the resource display software 102. In other words, when viewing said resource 1002 said user's display location 402 is either not determinable or not immediately determinable, as can occur when said resource 1002 contains or invokes a so-called endless scrolling feature. In a preferred embodiment, a user's user identity token 409 will contain a symbol indicating that state of affairs with a graphic or alphanumeric progress indicator 1905 of how many times the endless scroll feature has been invoked. This progress indicator augmentation also provides more accurate hyperlink 1605 operation when a user selects another user's a user identity token 409 in order to jump to the resources that other user is currently viewing.

While using viewing user software 105, in a preferred embodiment users 1000 involved in the expedition may use their resource display software 102 to explore resources available to them by selecting a hyperlink 1605 embedded in a resource 1002, by typing in identities of resources 303 or search terms or any other functionality of their resource display software 102 without restriction by viewing user software 105.

In a preferred embodiment, in addition to selecting hyperlinks embedded in a resource 1002 without being impeded by the invention, users may also select a hyperlink associated with another user's user identity token 409 in order to view the resources 1002 that other user is experiencing. Their viewing user software 105 makes this happen using the relevant identity of resource and user display location positional parameters 1304. This is illustrated in FIG. 16 showing that a hyperlink 1605 is embedded in B's user identity token 1601 such that it is selectable by another user to jump to B's user display location 304 which feature would be available for any user identity token 409 provided a user data exchange 106 had been received from them comprising such identity of resource 303 and user display location 304. Since the hyperlink 1605 is embedded, it is not separately visible in FIG. 16.

In a preferred embodiment, viewing user software 105 provides a user a preview 1606 of resources being viewed at other user's display location 304, this is distinct from selecting the hyperlink 1605 and the user may opt in the edit configuration functions to have such preview 1606 shown upon mouse rollover or by default next to the relevant user's user identity token 1601.

Regarding display window emulation, in a preferred embodiment, when a hyperlink 1605 embedded in a user identity token 402 is selected, viewing user software 105 may generate a display window 301 that simulates or emulates a resource display 302 and/or display window 301 of the other user. Use of this mode enables a user selecting a hyperlink 1605 to see what is actually being displayed to the other user as opposed to what would be displayed on their own user display 104 using the hyperlink alone. This feature may be realized by viewing user software 105 detecting users' computing device 101, user display 104 and resource display software 102 configuration data comprising screen resolution, aspect ratio and size information and thereby providing screen emulation parameters in a user data exchange 106 using a message data type 1308 of system characteristics message 1313. This feature may also be realized wholly or in part without resolution information by using user display location positional parameters 1304 that include scaling factors (1305B, 1306B).

The flow charts and software described herein may be implemented in software or firmware program instructions and logic which are stored in the memory of one or more devices and executed on one or more computer processors. Viewing user software 105 may be, for example, a plug in or extension to an existing software program, such as an Internet browser, an application program or "app" which may be specialized for a particular type of resource or user or may otherwise be programmed into, integrated or subsumed within a larger program or system of any type to achieve and implement the system and method for exchanging and displaying resource viewing position and related information. Viewing user software 105 may also be implemented using any convenient computer systems architecture such as program instructions stored on a network-attached device and downloaded or otherwise exchanged between computers and executed by the processor.

In this description the word "expedition" is used as a general term to refer to one or more users commencing or participating in resource viewing assisted by viewing user software 105. Such activities may not be literal expeditions and the reasons and aims of the users may be varied; for example types of expedition may be ongoing, perpetual and with topics and sup-topics and related resource viewing evolving over time, the activities might also, for example, in the nature of a challenge or competition such as a resource treasure hunt where steps must be accomplished to gain access to further resources, and may have more than one purpose, for example to both provide users with resource access and at the same time provide real-time surveillance and logging of the resource viewing experiences. In addition to the list of resources and users being limited by the initiator, other limitations and permissions may be applied such as minimum and maximum user participation, mandatory participants, ability to spawn subsidiary expeditions, to stop/resume and repeat expeditions, ability to access certain participant details and determine classes of participant in addition to a leader and general participant e.g. a 'follower' that may have access to certain user data exchange information but whose user identity token 409 may be suppressed from some or all display maps 1704. Similarly, the viewing user software 105 may have multiple and varying types of implementation, for example for scheduled or impromptu resource viewing along with the general public after which the resource may be withdrawn, scheduled or unscheduled expeditions but in a channel format or based around specific resources or resource types comprising fixed or dynamic content such as RSS feeds and information feeds that may be moderated by a digital 'anchor'. In summary, there is no specific purpose or other constraint on the application of viewing user software 105, rather, it provides resource providers, resource viewing software providers and resource users a general purpose tool with which to share resource viewing experiences.

This description of viewing user software 105 provides a preferred embodiment of how an expedition may be initiated provided users are employing compatible viewing user software 105, see also at FIG. 5. That preferred embodiment embraces and does not exclude individual users and pre-existing groups of users communicating with each other outside a preferred embodiment, for example by email, to identify sources of compatible viewing user software 105 and to exchange information relevant to joining expeditions supported by such software. The viewing user software 105 and its associated user data exchanges 106 and data groups, example at FIG. 12, that implement the initiation of an expedition support any invitation protocols, for example, where a non-leader user wishes to invite a third party not known to the expedition initiator. Such data may be exchanged as links obtained from the viewing user software 105 and its associated user data exchanges 106 and data groups identifying the expedition and allowing or denying such third party access to the expedition. Such links to associated user data exchanges 106 and data groups identifying the expedition may thus be shared, and sharing may be restricted, by interest groups on a social networking site or within a company. In this way users may control the degree of resource viewing experiences shared with persons they know either in real life or through electronic social networks in varying degrees and by recommendation.

This description and the drawings of viewing user software 105 and a graphical user interface necessarily use symbols to represent and convey a set of circumstances and thus the description and drawings herein imply a convention as to which symbols will be used to convey which state of affairs. They convey, though, a preferred embodiment that may be accomplished using different stylistic conventions in a different embodiment. Thus, such conventions in representing a state of affairs may vary appearance but do not necessarily affect the utility or method employed. The styles used in the preferred embodiments described herein may therefore vary without limitation in other embodiments with no change in the teaching of the intrinsic art. For example, styles conveying the entropy of the underlying state of affairs in this description may be interchanged between different graphics, characters that may be alphanumeric or novel, animations, colors, size variations, time-based effects, sounds, vibrations or any form of information signaling.

Figure 15:
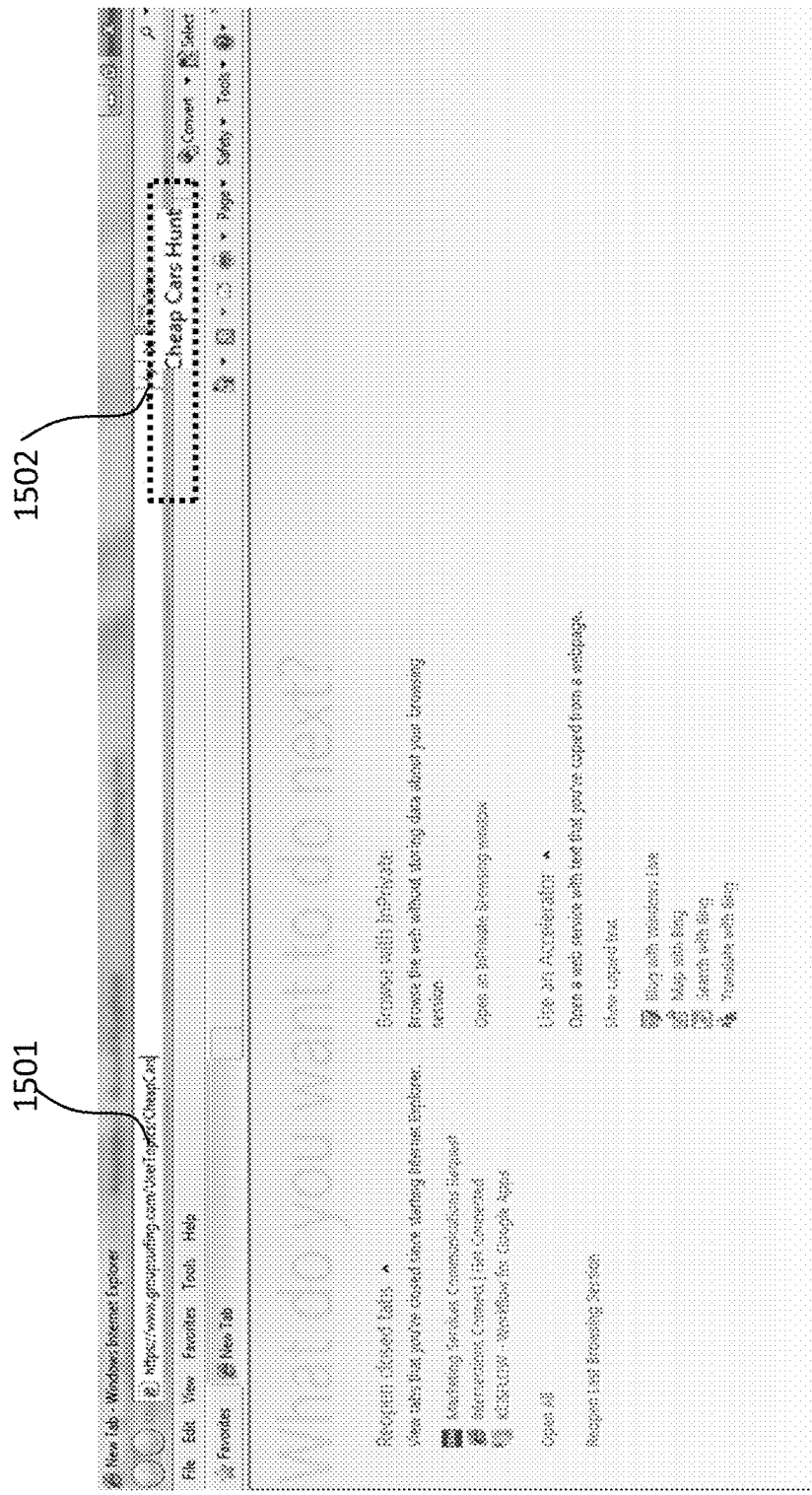
FIG. 15 illustrates usage of an expedition name parameter shown within a variable expedition name display zone.

While particular embodiments have been shown and described herein, one of ordinary skill in the art will understand that changes may be made to those embodiments without departing from the spirit and scope of the invention. This description of viewing user software 105 provides a preferred embodiment of user display locations 304 and derived graphical display maps 1704 whereas other embodiments may use different conventions for conveying and representing the types of information involved. For example, rather than overlays directly in a display window 301 as illustrated in FIG. 15 onwards, viewing position and associated information could be displayed in a separate window leaving the user to mentally superimpose the information to achieve the overlay. Furthermore, varying subsets of information may be extracted from user data exchanges 106 and used by an embodiment of viewing user software 105 to provide display maps 1704 that are most relevant to the type of expedition being carried out; for example, for a user interested in how another user has traversed resources, a stacked 3D display showing successive resources viewed by one or more users and a preview 1606 of each one, or for a user managing a program under which there are multiple expeditions, a consolidated view of all current and/or historical expeditions meeting specific criteria, e.g. expedition name, showing which other users are/were participating in each one.

What is claimed is:

1. A method of processing user display location data related to electronic information resources being viewed by a plurality of users, comprising:

determining, using a processor, a first user's display location within a first electronic information resource;

receiving in real-time at least one other user's display location and associated information within an electronic information resource that is different from the first electronic information resource;

displaying a map overlaid on at least a portion of the first electronic resource in real-time comprising at least one user identity token representing the at least one other user displayed on the map such that it conveys a directional distance ratio between the at least one other user's display location within the different electronic information resource and the first user's display location within the a first electronic information resource.

2. The method according to claim 1, wherein the positioning and state of the at least one other user's identity token indicates which portion of the different electronic information resource is being displayed to the at least one other user.

3. The method according to claim 2, wherein the positioning of the at least one other's identity token is calculated using one or more directional distance ratios derivable from a dimension of the distance between the beginning of the different electronic information resource when displayed on an unlimited size display compared to a similar dimension of the portion of the different electronic information resource actually displayed in that direction to the at least one other user.

4. The method according to claim 3, wherein the direction of the distance ratio is vertical.

5. The method according to claim 3, wherein the direction of the distance ratio is horizontal.

6. The method according to claim 2, wherein the positional parameters include one or more directional scaling factors derived from the number of display windows that would be required to display the fully displayable electronic information resource from beginning to end in that direction.

7. The method according to claim 6, wherein the direction of the scaling factor is vertical.

8. The method according to claim 6, wherein the direction of the scaling factor is horizontal.

9. The method according to claim 1, wherein the displaying is performed within display windows adjustable and selectable by the user.

10. The method according to claim 1, wherein the at least one other user's identity token is displayed on the map based additionally on the first user's display location history.

11. The method according to claim 1, further comprising:
receiving in real-time a display location of a second user among the at least one other user and associated information relative to the first electronic information resource; and
displaying an identity token representing the second user displayed on the map based on the current display locations of the first user and the second user.

12. The method according to claim 1, wherein the map is overlaid on the electronic information resource.

13. The method according to claim 1, wherein the map is displayed separately from the electronic information resource.

14. The method according to claim 1 further comprising:
determining, using a processor, a user's display location including the identity of the electronic information resource being displayed;
transmitting that user display location to at least one other computing device.

15. The method according to claim 14, wherein the transmitting further comprises the electronic information resource being displayed.

16. The method according to claim 14, wherein the transmitting further comprises a user-supplied comment message in context with user display location data.

17. The method according to claim 14, wherein the user-supplied comment message further includes data referencing a specific display element within the electronic information resource to which the comment applies.

18. The method according to claim 1, further comprising:
displaying a representation of one or more users at map positions based on the identity of the electronic information resources the at least one other users are viewing and their positional parameters relative to the identity of the electronic information resource and the positional parameters of the first user.

19. The method according to claim 1, further comprising displaying a user-supplied comment message at a position on the map in context with the position on the map representing the user making the comment.

20. The method according to claim 1, further comprising displaying a user-supplied comment message at a position on the map in context with the location of a specific display element referenced in the message relative to the current user's display location.

21. The method according to claim 1, further comprising:
selecting on the map of the user display location of a selected one of the at least one other user; and
displaying the electronic information resource being displayed to the selected user.

22. The method according to claim 21, wherein the portion of the electronic information resource displayed is determined by the positional parameters within the selected user's user display location data.

23. The method according to claim 21, wherein the displaying of the selected user's resource display emulates the resource display of the selected user's hardware and software through the exchanging of system parameters comprising screen resolution, aspect ratio and size.

24. The method according to claim 1, further comprising displaying a preview of the electronic information resources referenced in the user display location data of a previewing one of the at least one other user at a map position in context with the position on the map of the representation of the previewing user.

25. The method according to claim 1, wherein a headline from the electronic information resources referenced in the user display location data of the at least one other user is displayed at a map position in context with the position on the map of the representation of the at least one other user.

26. An apparatus for displaying user display location data related to an electronic information resource, comprising:
a display;
an input/output hardware unit capable of exchanging user display location data with a network and data associated with electronic resources accessible over the network;
a program memory storing program instructions; and
a processor, coupled to the memory, the display and the input/output hardware unit, capable of executing the program instructions to (i) determine a first user's display location within a first electronic information resource, (ii) receive in real-time at least one other user's display location and associated information within an electronic information resource that is different from the first electronic information resource, and (iii) display a map overlaid on at least a portion of the first electronic resource in real-time comprising at least one user identity token representing the at least one other user displayed on the map based on the at least one other user's display location, such that it conveys a directional distance ratio between the at least one other user's display location within the different electronic information resource and the a first user's display location within the first electronic information resource.

27. A computer program product for displaying user display location data related to an electronic information resource, including computer program logic stored in a tangible medium, wherein the computer program logic comprises:
determining logic for causing a computer to determine a first user's display location within a first electronic information resource;

receiving logic for causing the computer to receive at least one other user's display location and associated information within an electronic information resource that is different from the first electronic information resource; and displaying logic for causing the computer to display a map overlaid on at least a portion of the first electronic information resource in real-time comprising at least one user identity token representing the at least one other user displayed on the map based on the at least one other user's display location, such that it conveys a directional distance ratio between the at least one other user's display location within the different electronic information resource and the first user's display location within the a first electronic information resource.

* * * * *